United States Patent [19]
Iwata

[11] Patent Number: 5,408,361
[45] Date of Patent: Apr. 18, 1995

[54] FOCAL LENGTH TRANSITIONAL METHOD, AUXILIARY LENS FOR TRANSITING FOCAL LENGTHS, AND LENS SYSTEM AND FINDER HAVING FOCAL LENGTH TRANSITIONAL FUNCTION

[75] Inventor: Noriyuki Iwata, Fujisawa, Japan
[73] Assignee: Ricoh Company, Ltd., Tokyo, Japan
[21] Appl. No.: 972,325
[22] Filed: Nov. 5, 1992

[30] Foreign Application Priority Data

Nov. 26, 1991 [JP] Japan .................................. 3-310877
Jan. 29, 1992 [JP] Japan .................................. 4-014289
Sep. 21, 1992 [JP] Japan .................................. 4-251604

[51] Int. Cl.⁶ ...................... G02B 15/02; G02B 13/02
[52] U.S. Cl. ..................................... 359/674; 354/223
[58] Field of Search .................. 359/672, 674; 354/223

[56] References Cited

U.S. PATENT DOCUMENTS 4,708,442 11/1987 Fujii et al. ............................ 359/674
5,097,360 3/1992 Fukami et al. ....................... 359/674

FOREIGN PATENT DOCUMENTS 58-200207 11/1983 Japan .................................. 359/674
60-168114 8/1985 Japan .
61-40965 9/1986 Japan .

Primary Examiner—Scott J. Sugarman
Attorney, Agent, or Firm—Oblon, Spivak, McClelland, Maier & Neustadt

[57] ABSTRACT

A varifocal lens system is constructed by two or more lens groups and has a function for changing a focal length of the lens system by changing a distance between the lens groups while the position of an image face is constantly held. An auxiliary lens constructed by two lens groups having negative and positive refracting powers is inserted into an increased clearance between lens groups in a shortest focal length state such that a lens group having the negative refracting power is located on an object side. The focal length of the lens system is transited to the side of a focal length shorter than the shortest focal length without changing the position of the image face by the insertion of the auxiliary lens. The auxiliary lens can be constructed by a single lens group having negative refracting power. In accordance with the above structure, focal lengths of the varifocal lens system can be transited to each other without increasing an entire length of the varifocal lens system.

14 Claims, 15 Drawing Sheets

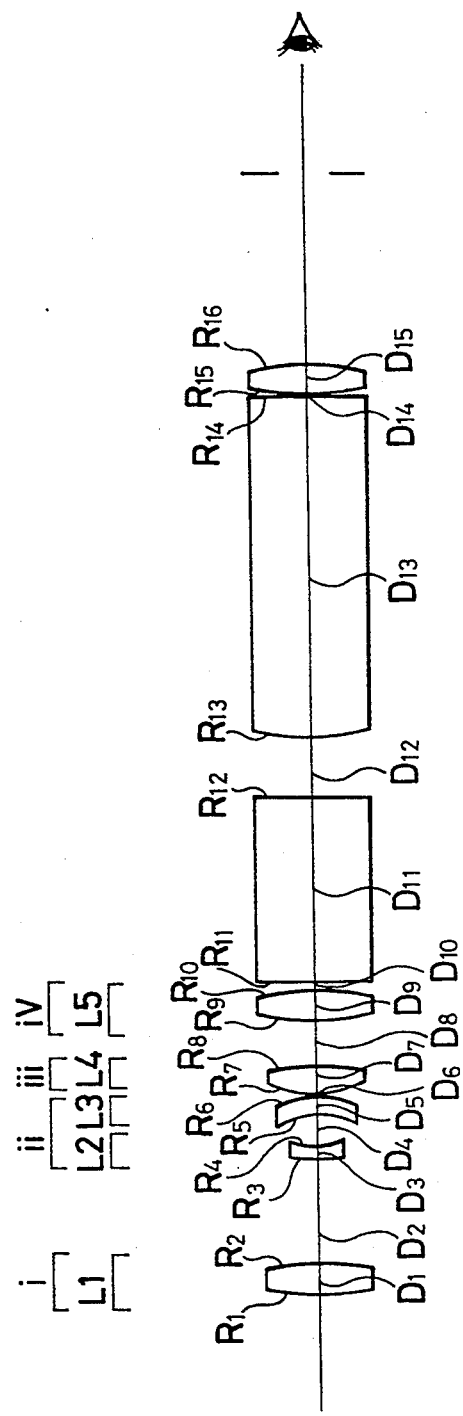
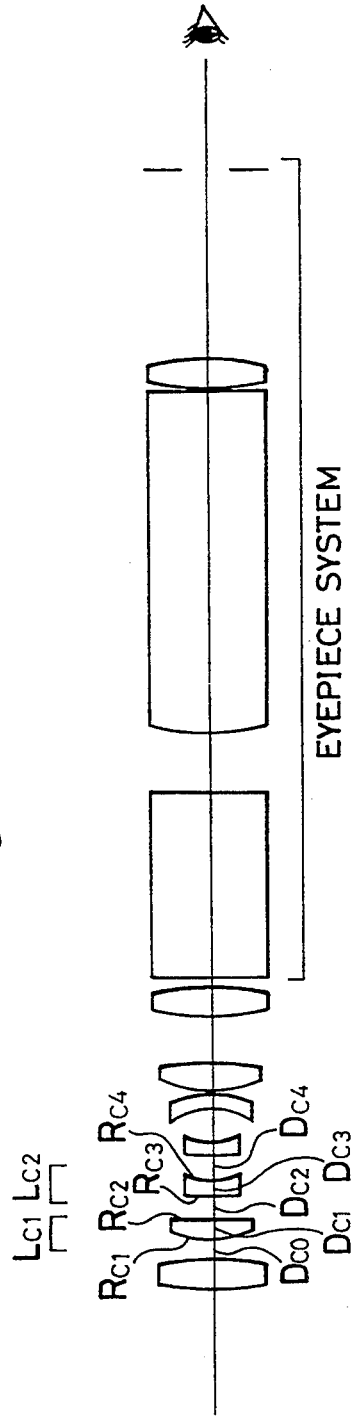
Fig.2a
Fig.2b

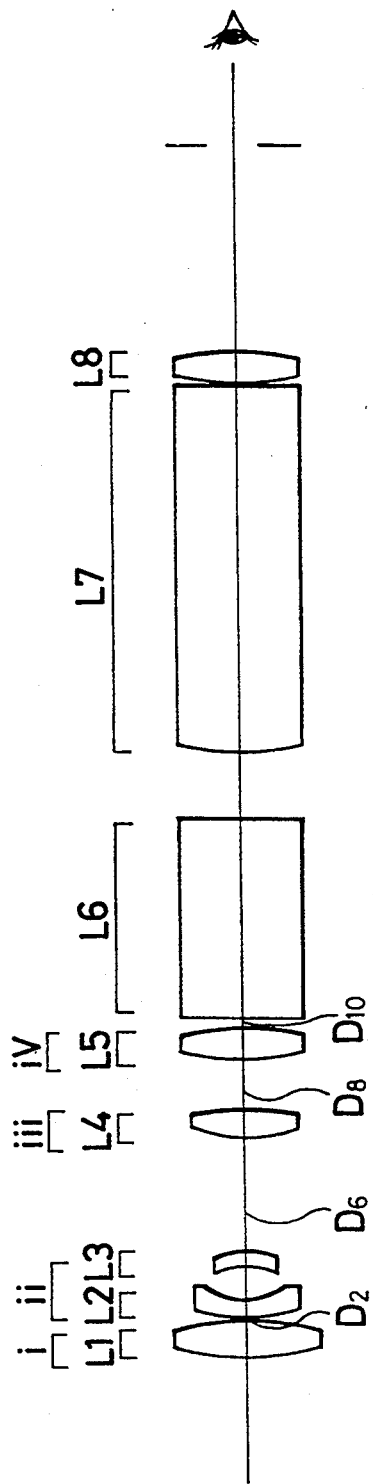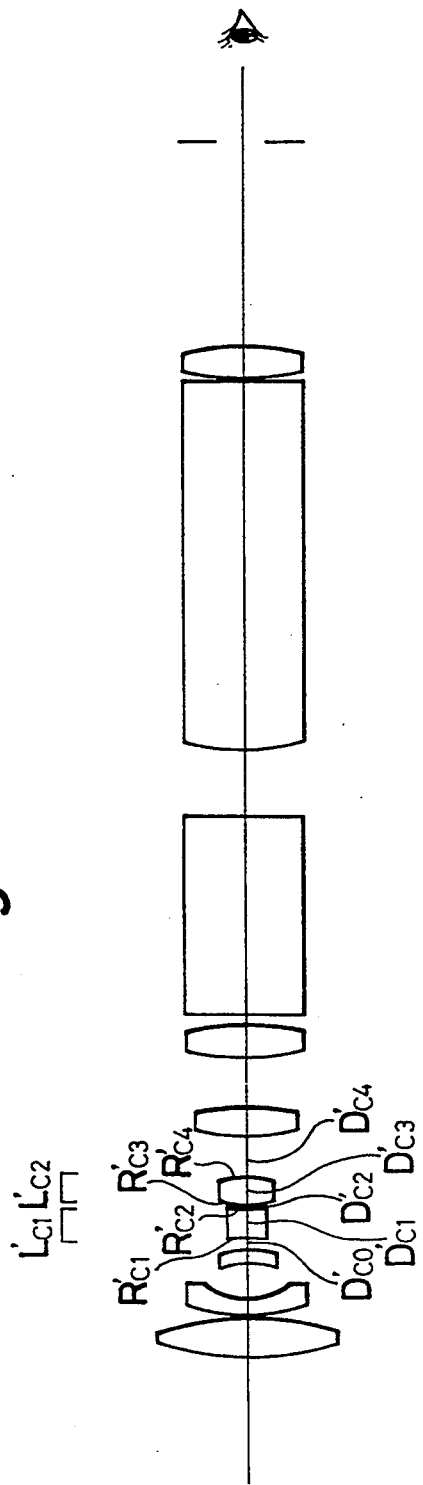

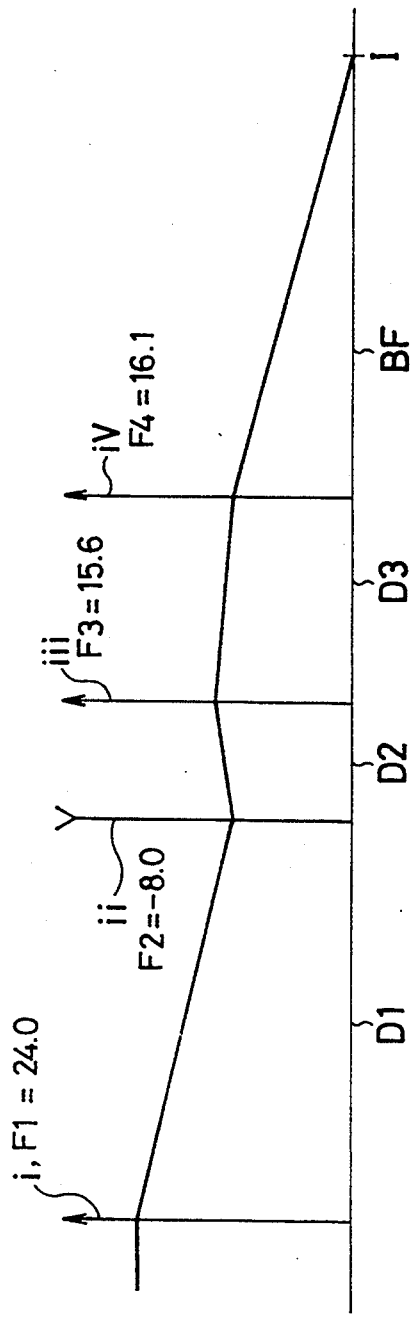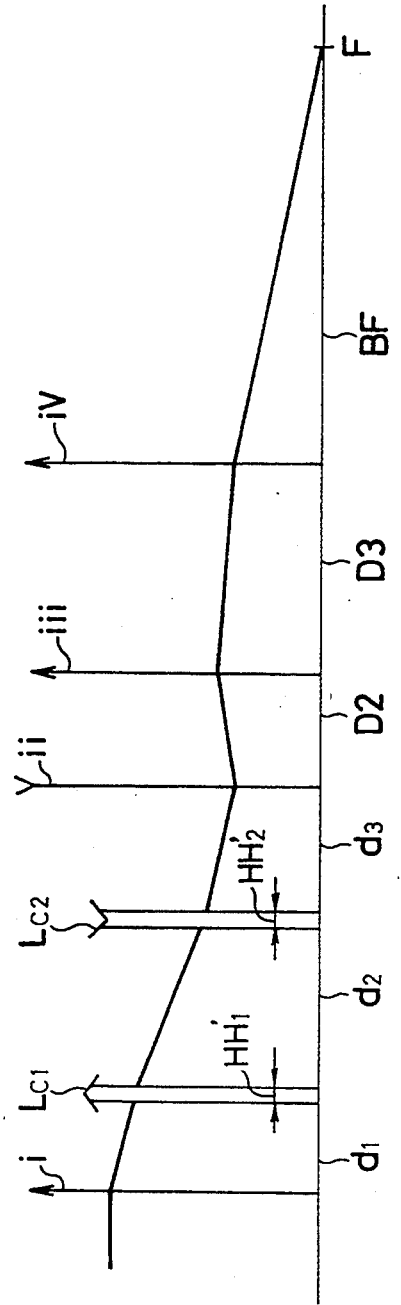

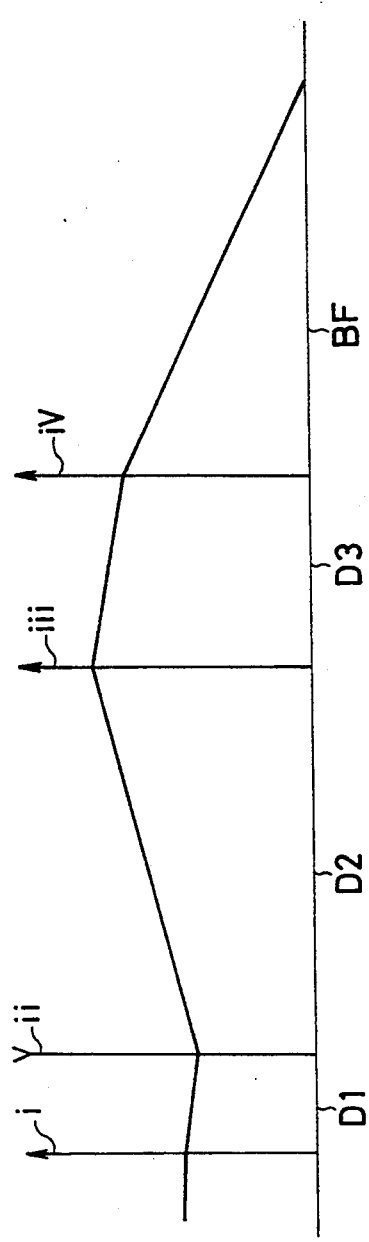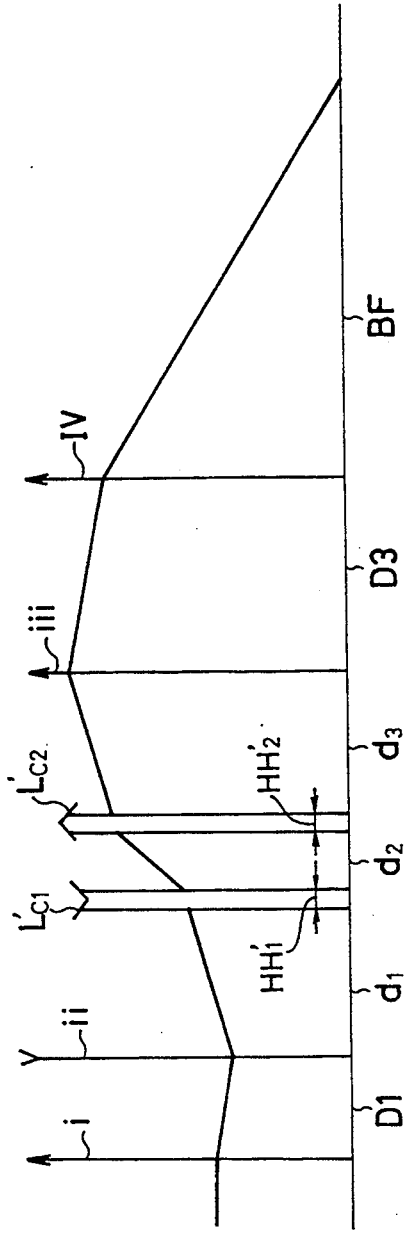

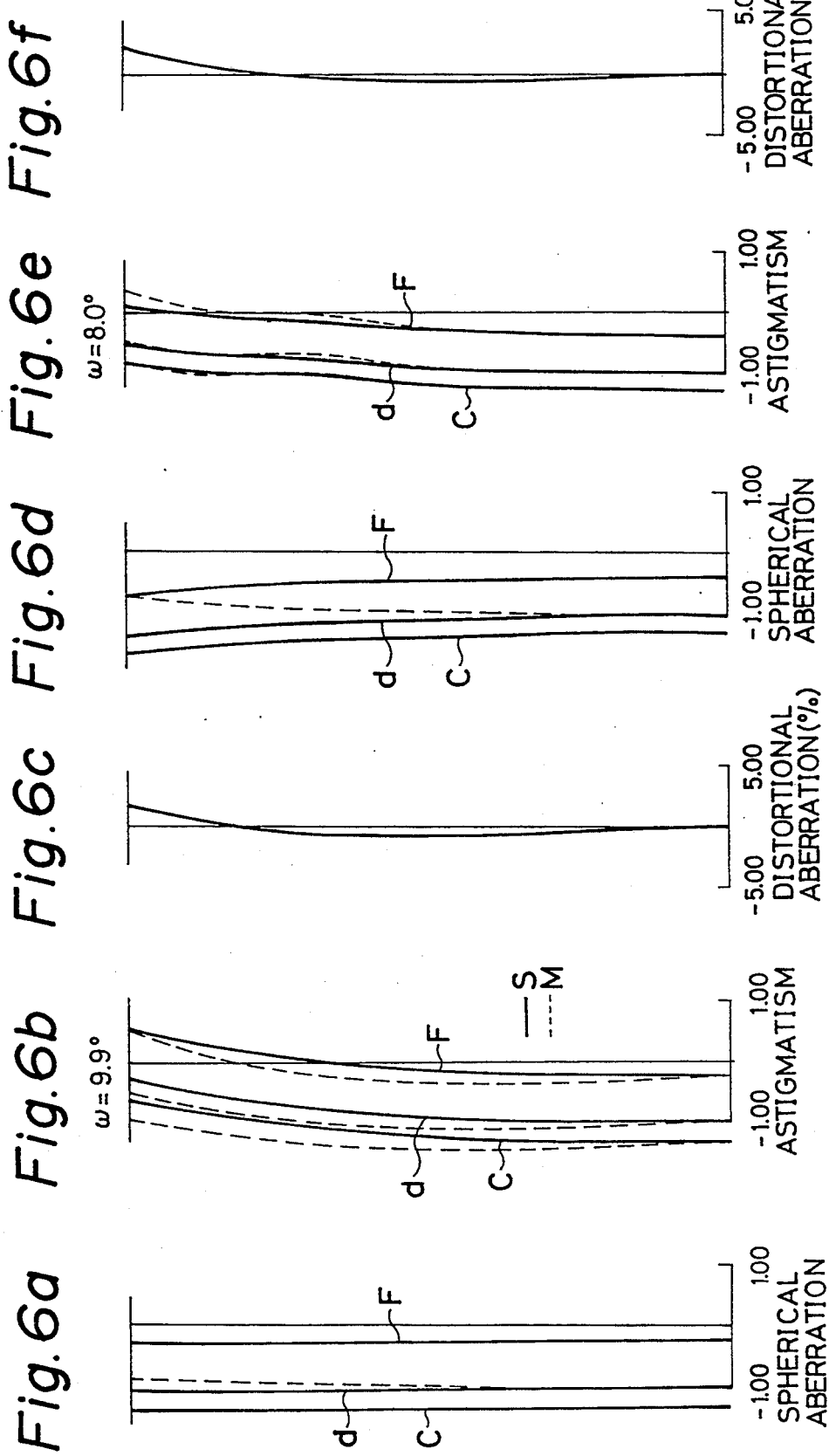

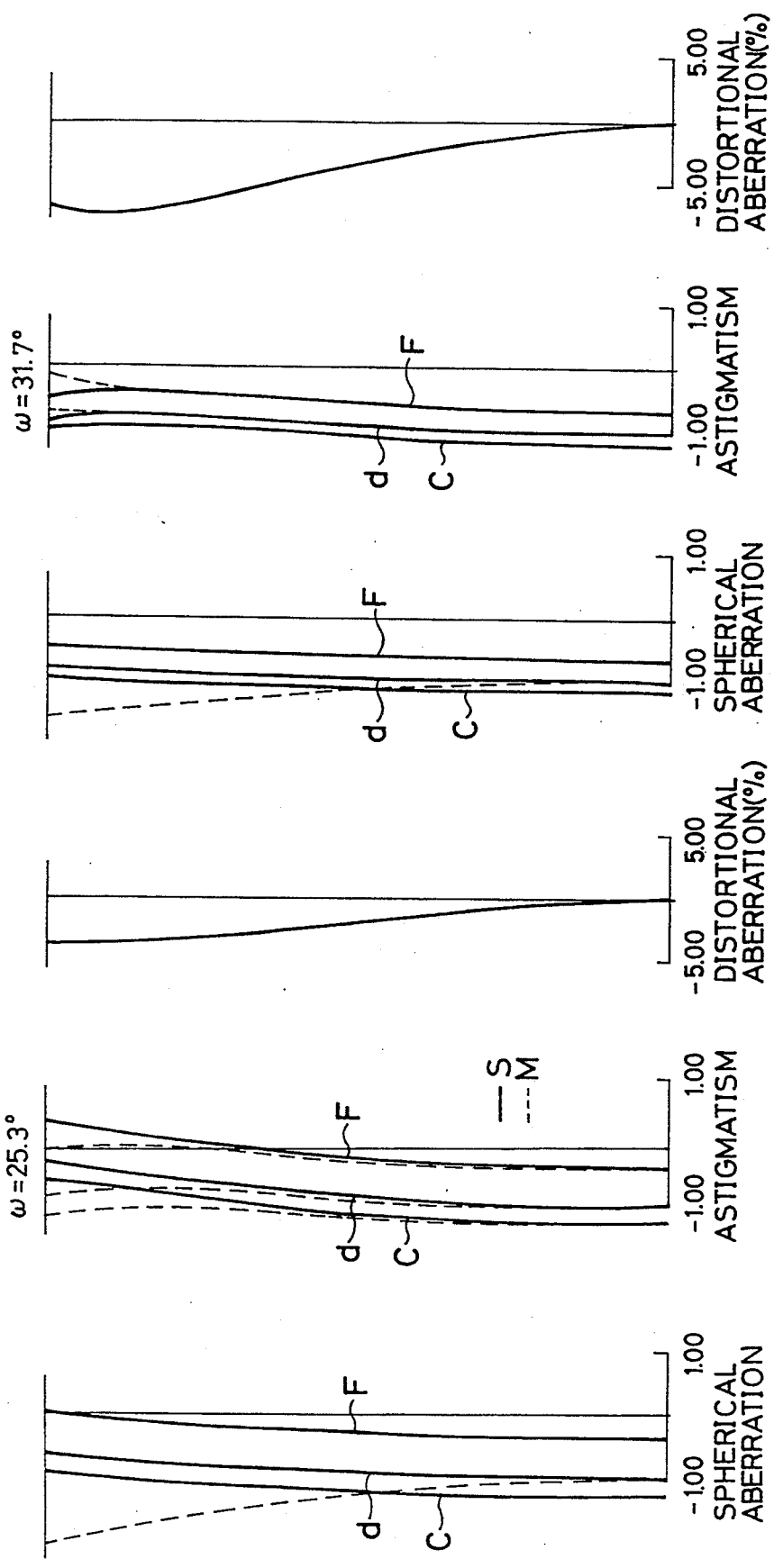

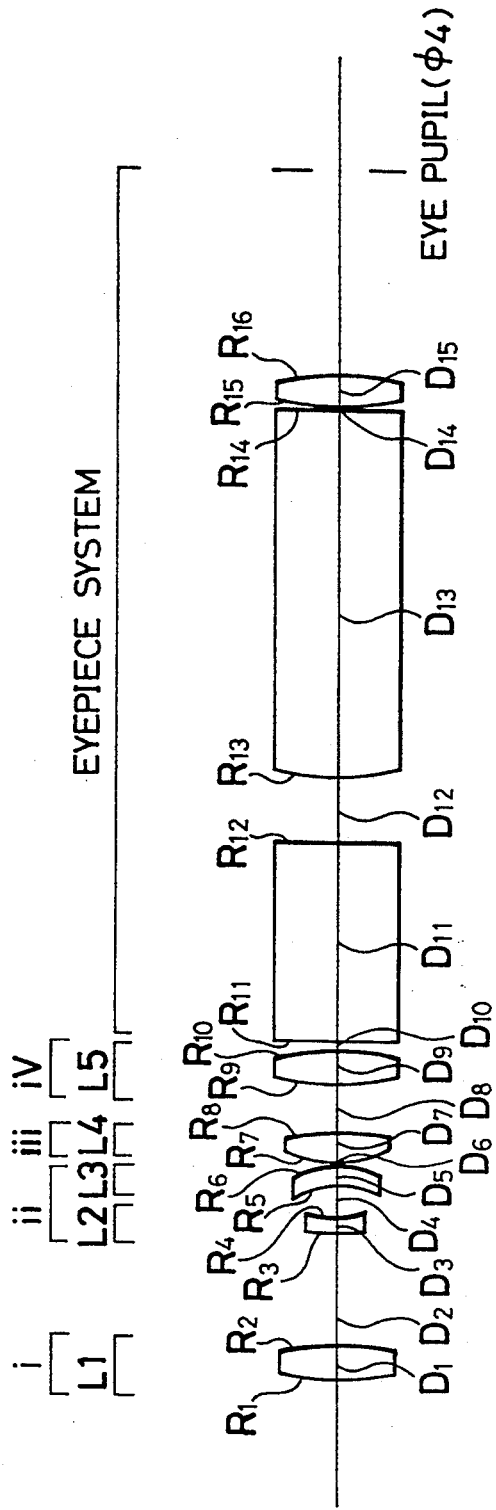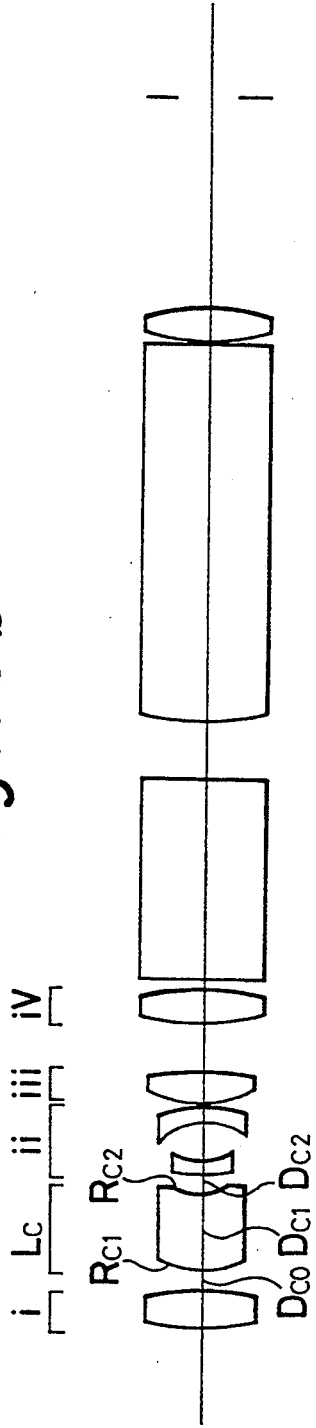

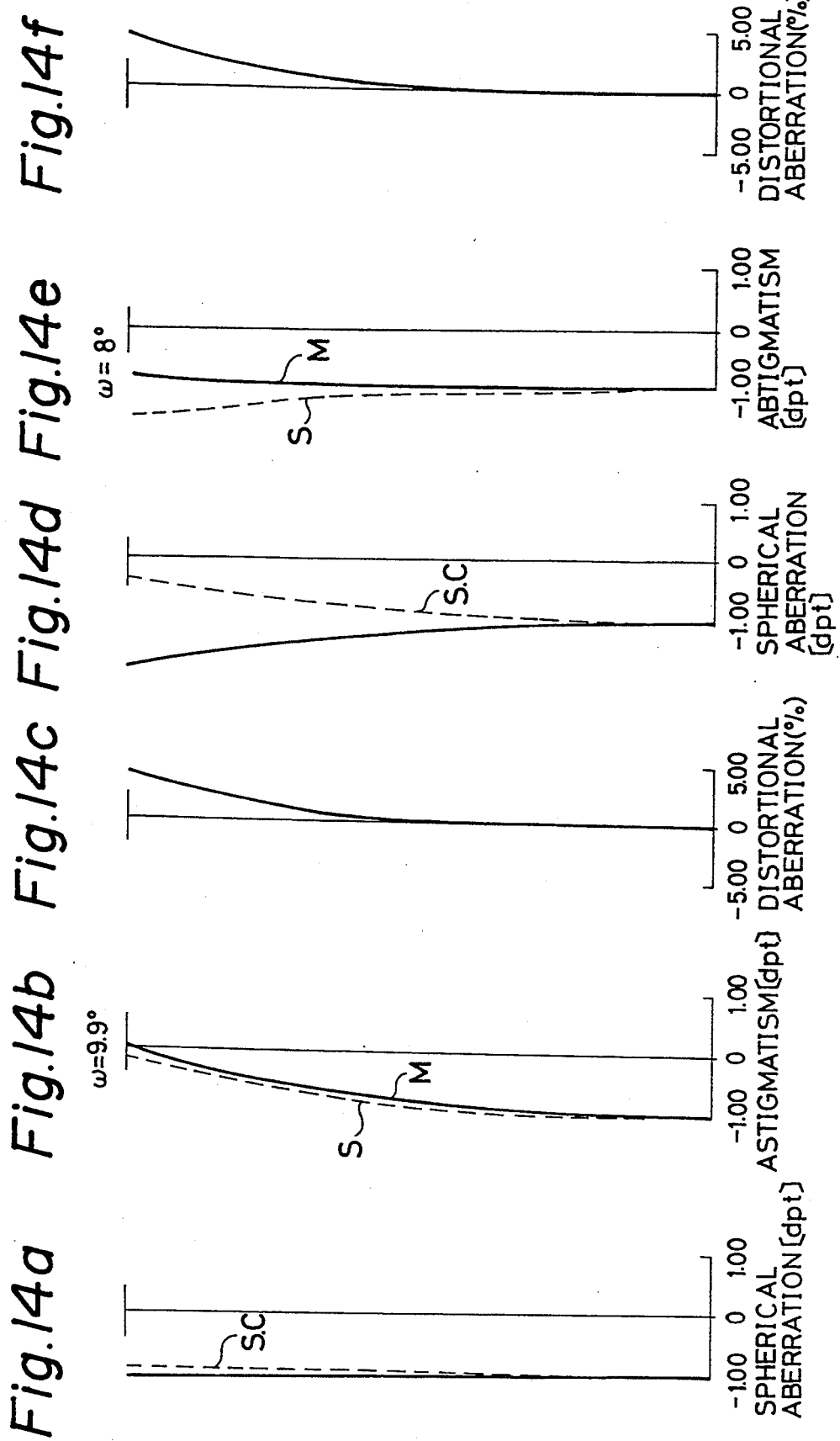

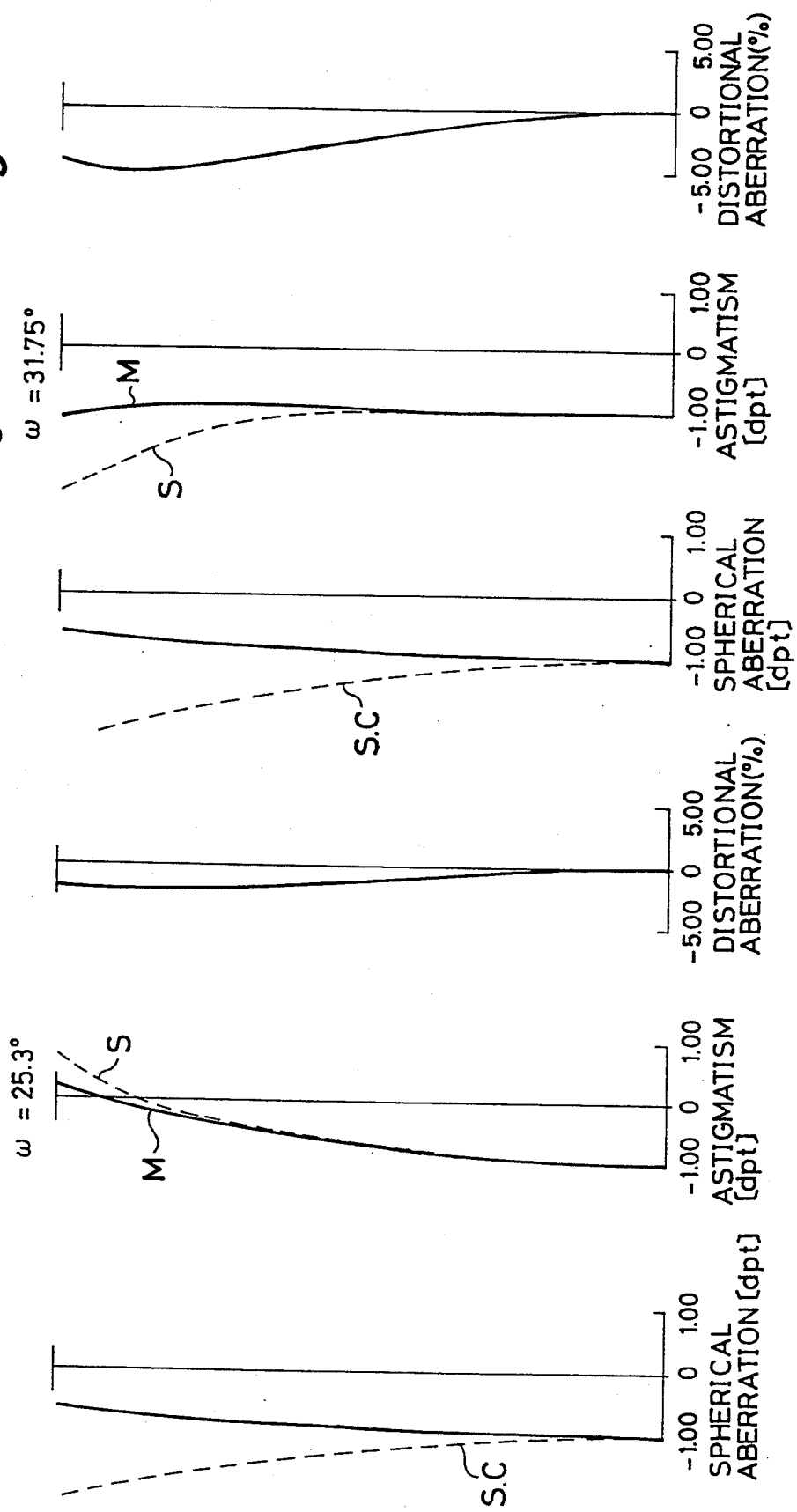

FOCAL LENGTH TRANSITIONAL METHOD, AUXILIARY LENS FOR TRANSITING FOCAL LENGTHS, AND LENS SYSTEM AND FINDER HAVING FOCAL LENGTH TRANSITIONAL FUNCTION

BACKGROUND OF THE INVENTION

1. Field of the Invention

The present invention relates to a focal length transitional method, an auxiliary lens for transiting focal lengths, and a lens system and a finder having a focal length transitional function.

2. Description of the Related Art

A varifocal lens system has a function for changing focal lengths by changing distances between lens groups while the position of an image surface is constantly held. In this varifocal lens system, an auxiliary lens is additionally used to provide a focal length shorter than a shortest focal length and provide a focal length longer than a longest focal length. Such a technique for changing or transiting the focal lengths is shown in Japanese Patent Application Laying Open (KOKAI) No. 60-168114, Japanese Patent Publication (KOKOKU) No. 61-40965, etc.

When the focal lengths of the lens system are transited by inserting and arranging the auxiliary lens between constructional lens groups, a space for inserting the auxiliary lens is generally disposed in advance within the varifocal lens system when the structure of lenses is designed. Therefore, there is a problem that an entire length of the varifocal lens system is increased.

SUMMARY OF THE INVENTION

It is therefore an object of the present invention to provide a focal length transitional method, an auxiliary lens for transiting focal lengths, and a lens system and a finder having a focal length transitional function in which the focal lengths can be changed or transited without increasing the entire length of a varifocal lens system.

In accordance with a first lens structure of the present invention, the above object can be achieved by a focal length transitional method used in a varifocal lens system which is constructed by two or more lens groups and has a function for changing a focal length of the lens system by changing a distance between the lens groups while the position of an image surface is constantly held; the focal length transitional method comprising the steps of inserting an auxiliary lens constructed by two lens groups having negative and positive refracting powers into an increased clearance between lens groups in a shortest focal length state such that a lens group having the negative refracting power is located on an object side; and changing the focal length of the lens system such that the shortest focal length is decreased without changing the position of the image face by the insertion of the auxiliary lens.

In accordance with a second lens structure of the present invention, the above object can be also achieved by a focal length transitional method used in a varifocal lens system which is constructed by two or more lens groups and has a function for changing a focal length of the lens system by changing a distance between the lens groups while the position of an image surface is constantly held; the focal length transitional method comprising the steps of inserting an auxiliary lens constructed by two lens groups having positive and negative refracting powers into an increased clearance between lens groups in a longest focal length state such that a lens group having the positive refracting power is located on an object side; and transiting the focal length of the lens system such that the longest focal length is increased without changing the position of the image surface by the insertion of the auxiliary lens.

In accordance with a third lens structure of the present invention, the above object can be also achieved by an auxiliary lens for transition of focal lengths added to a varifocal lens system which is constructed by two or more lens groups and has a function for changing a focal length of the lens system by changing a distance between the lens groups while the position of an image surface is constantly held; the auxiliary lens transiting the focal length of the lens system such that a shortest focal length of the lens system is decreased without changing the position of the image surface; the auxiliary lens being constructed by two lens groups which is composed of a lens group having negative refracting power on an object side and a lens group having positive refracting power on an image side; and the auxiliary lens being inserted into an increased clearance between lens groups in a state of the shortest focal length of the varifocal lens system.

In accordance with a fourth lens structure of the present invention, the above object can be also achieved by an auxiliary lens for transition of focal lengths added to a varifocal lens system which is constructed by two or more lens groups and has a function for changing a focal length of the lens system by changing a distance between the lens groups while the position of an image surface is constantly held; the auxiliary lens transiting the focal length of the lens system such that a longest focal length of the lens system is increased without changing the position of the image surface; the auxiliary lens being constructed by two lens groups which is composed of a lens group having positive refracting power on an object side and a lens group having negative refracting power on an image side; and the auxiliary lens being inserted into an increased clearance between lens groups in a state of the longest focal length of the varifocal lens system.

In accordance with a seventh lens structure of the present invention, the above object can be also achieved by a lens system having a focal length transitional function comprising a varifocal lens system constructed by three or more lens groups and having a function for changing a focal length of the varifocal lens system by changing a distance between the lens groups while the position of an image surface is constantly held; and an auxiliary lens for decrease in focal length and/or an auxiliary lens for increase in focal length; the auxiliary lens for decrease in focal length being added to the varifocal lens system and transiting the focal length of the varifocal lens system such that a shortest focal length is decreased; the auxiliary lens for increase in focal length being added to the varifocal lens system and transiting the focal length of the varifocal lens system such that a longest focal length is increased; the auxiliary lens for decrease in focal length being constructed by two lens groups which is composed of a lens group having negative refracting power on an object side and a lens group having positive refracting power on an image side; the auxiliary lens for decrease in focal length being inserted into an increased clearance between lens groups in a state of the shortest focal length of the varifocal lens system; the auxiliary lens for increase in focal length being constructed by two lens groups which is composed of a lens group having positive refracting power on the object side and a lens group having negative refracting power on the image side; and the auxiliary lens for increase in focal length being inserted into an increased clearance between lens groups in a state of the longest focal length of the varifocal lens system.

In accordance with an eighth lens structure of the present invention, the above object can be also achieved by a finder comprising an objective lens system constructed by a lens system having a focal length transitional function; and an eyepiece system arranged on an image side of the objective lens system. The lens system having the focal length transitional function comprises a varifocal lens system constructed by three or more lens groups and having a function for changing a focal length of the varifocal lens system by changing a distance between the lens groups while the position of an image surface is constantly held; and an auxiliary lens for decrease in focal length and/or an auxiliary lens for increase in focal length; the auxiliary lens for decrease in focal length being added to the varifocal lens system and transiting the focal length of the varifocal lens system such that a shortest focal length is increased; the auxiliary lens for increase in focal length being added to the varifocal tens system and transiting the focal length of the varifocal lens system such that a longest focal length is increased; the auxiliary lens for decrease in focal length being constructed by two lens groups which is composed of a lens group having negative refracting power on an object side and a lens group having positive refracting power on an image side; the auxiliary lens for decrease in focal length being inserted into an increased clearance between lens groups in a state of the shortest focal length of the varifocal lens system; the auxiliary lens for increase in focal length being constructed by two lens groups which is composed of a lens group having positive refracting power on the object side and a lens group having negative refracting power on the image side; and the auxiliary lens for increase in focal length being inserted into an increased clearance between lens groups in a state of the longest focal length of the varifocal lens system.

In accordance with a ninth lens structure of the present invention, the above object can be also achieved by an auxiliary lens for transition of focal lengths in a varifocal lens system constructed by two or more lens groups and having a function for changing a focal length of the varifocal lens system by changing a distance between the lens groups while the position of an image surface is constantly held; the auxiliary lens being additionally arranged in an increased clearance between lens groups in the state of a shortest focal length; the auxiliary lens transiting the focal length of the lens system such that the shortest focal length of the lens system is increased without changing the position of the image surface; and the auxiliary lens constructed by a lens group having negative refracting power such that a rear side principal point is located on an object side with respect to a front side principal point.

In accordance with a tenth lens structure of the present invention, the above object can be also achieved by an auxiliary lens for transition of focal lengths in a varifocal lens system constructed by two or more lens groups and having a function for changing a focal length of the varifocal lens system by changing a distance between the lens groups while the position of an image surface is constantly held; the auxiliary lens being additionally arranged in an increased clearance between lens groups in the state of a longest focal length; the auxiliary lens transiting the focal length of the lens system such that the longest focal length of the lens system is increased without changing the position of the image surface; and the auxiliary lens constructed by a lens group having negative refracting power such that a rear side principal point is located on an object side with respect to a front side principal point.

In accordance with the above-mentioned lens structures of the present invention, it is possible to provide a focal length transitional method, an auxiliary lens for transiting focal lengths, and a lens system and a finder having a focal length transitional function in which the focal lengths can be changed or transited without increasing an entire length of the vat i focal lens system.

Further objects and advantages of the present invention will be apparent from the following description of the preferred embodiments of the present invention as illustrated in the accompanying drawings.

BRIEF DESCRIPTION OF THE DRAWINGS

FIGS. 2a and 2b are views showing an embodiment in which the focal length of a lens system is increased by the insertion of an auxiliary lens in a third lens structure of the present invention;

FIGS. 3a and 3b are views showing an embodiment in which the focal length of a lens system is reduced by the insertion of an auxiliary lens in a fourth lens structure of the present invention;

FIGS. 4a and 4b are diagrams showing light transmitted through the third lens structure in the embodiment of the present invention shown in FIG. 2;

FIGS. 5a and 5b are diagrams showing light transmitted through the fourth lens structure in the embodiment of the present invention shown in FIG. 3;

FIGS. 6a to 6c are diagrams respectively showing spherical aberration, astigmatism and distortional aberration in the case of a longest focal length;

FIGS. 6d to 6f are diagrams respectively showing spherical aberration, astigmatism and distortional aberration in the case of a longer focal length transited by the insertion of an auxiliary lens;

FIGS. 7a to 7c are diagrams respectively showing spherical aberration, astigmatism and distortional aberration in the case of a shortest focal length;

FIGS. 7d to 7f are diagrams respectively showing spherical aberration, astigmatism and distortional aberration in the case of a shorter focal length transited by the insertion of an auxiliary lens;

FIGS. 10a and 10b are views showing another embodiment in which the focal length of the lens system is increased by insertion of the auxiliary lens in the ninth lens structure of the present invention;

FIGS. 14a to 14c are diagrams respectively showing spherical aberration, astigmatism and distortional aberration in the case of a longest focal length in the embodiment of the present invention shown in FIG. 10;

FIGS. 14d to 14f are diagrams respectively showing spherical aberration, astigmatism and distortional aberration in the case of a longer focal length transited by the insertion of an auxiliary lens in the embodiment of the present invention shown in FIG. 10;

FIGS. 15a to 15c are diagrams respectively showing spherical aberration, astigmatism and distortional aberration in the case of a shortest focal length in the embodiment of the present invention shown in FIG. 11; and FIGS. 15d to 15f are diagrams respectively showing spherical aberration, astigmatism and distortional aberration in the case of a shorter focal length transited by the insertion of an auxiliary lens in the embodiment of the present invention shown in FIG. 11.

DESCRIPTION OF THE PREFERRED EMBODIMENTS

Figure 1A:
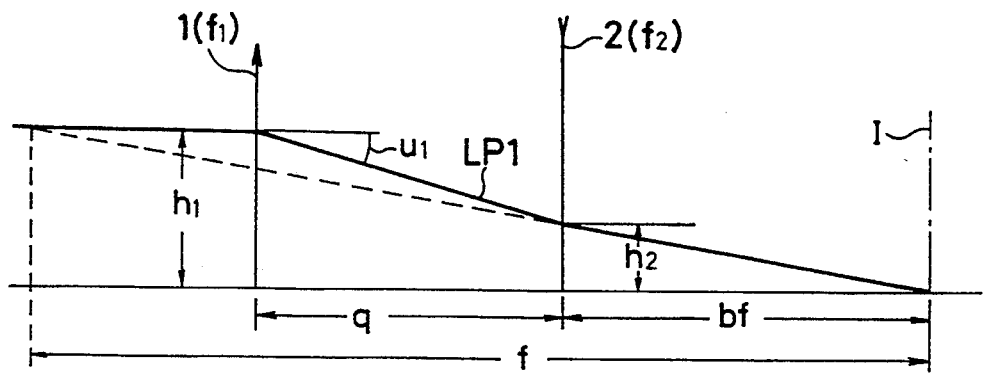
FIGS. 1a to 1c are views for explaining a focal length transitional method in a first lens structure of the present invention.

The preferred embodiments of a focal length transitional method, an auxiliary lens for transiting focal lengths, and a lens system and a finder having a focal length transitional function in the present invention will next be described in detail with reference to the accompanying drawings.

In accordance with a first lens structure of the present invention, a focal length transitional method is a method for transiting or changing the focal length of a varifocal lens system onto a shorter focal length side. This focal length transitional method is used as follows in the varifocal lens system which is constructed by two or more lens groups and has a function for changing the focal length of the lens system by changing a distance between the lens groups while the position of an image surface is held constant.

Namely, an auxiliary lens constructed by two lens groups having negative and positive refracting powers is inserted into an increased clearance between lens groups in a shortest focal length state such that a lens group having the negative refracting power is located on an object side. The focal length of the lens system is transited to the side of a focal length shorter than the shortest focal length without changing the position of the image surface by the insertion of the auxiliary lens.

In accordance with a second lens structure of the present invention, a focal length transitional method is a method for transiting the focal length of a varifocal lens system onto a longer focal length side. This focal length transitional method is used as follows in the varifocal lens system which is constructed by two or more lens groups and has a function for changing the focal length of the lens system by changing a distance between the lens groups while the position of an image surface is constantly held.

Namely, an auxiliary lens constructed by two lens groups having positive and negative refracting powers is inserted into an increased clearance between lens groups in a longest focal length state such that a lens group having the positive refracting power is located on an object side. The focal length of the lens system is transited to the side of a focal length longer than the longest focal length without changing the position of the image surface by the insertion of the auxiliary lens.

An auxiliary lens for transition of focal lengths in a third lens structure of the present invention is an auxiliary lens for executing the focal length transitional method in the first lens structure. The auxiliary lens is constructed by two lens groups which is composed of a lens group having negative refracting power on an object side and a lens group having positive refracting power on an image side. The auxiliary lens is inserted into an increased clearance between lens groups in a state of the shortest focal length of the varifocal lens system.

An auxiliary lens for transition of focal lengths in a fourth lens structure of the present invention is an auxiliary lens for executing the focal length transitional method in the second lens structure. The auxiliary lens is constructed by two lens groups which is composed of a lens group having positive refracting power on an object side and a lens group having negative refracting power on an image side. The auxiliary lens is inserted into an increased clearance between lens groups in a state of the longest focal length of the varifocal lens system.

In accordance with a fifth lens structure of the present invention, the auxiliary lens for transition of focal lengths in each of the third and fourth lens structures is preferably inserted in the vicinity of an entrance pupil about an optical system located on the image side with respect to an inserting position of the auxiliary lens.

In accordance with a sixth lens structure of the present invention, $v_P > v_N$ is desirably set with respect to lenses constituting the auxiliary lens for transition of focal lengths in each of the third, fourth and fifth lens structures when $v_P$ is an Abbe's number of a lens having the positive refracting power and $v_N$ is an Abbe's number of a lens having the negative refracting power.

A lens system having a focal length transitional function in a seventh lens structure of the present invention has a varifocal lens system, an auxiliary lens for decrease in focal length and/or an auxiliary lens for increase in focal length.

In the seventh lens structure, the varifocal lens system is constructed by three or more lens groups and has a function for changing a focal length of the varifocal lens system by changing a distance between the lens groups while the position of an image surface is constantly held.

In the seventh lens structure, the auxiliary lens for decrease in focal length is added to the varifocal lens system and transits the focal length of the varifocal lens system onto the side of a focal length shorter than a shortest focal length. The auxiliary lens for decrease in focal length is constructed by an auxiliary lens having the above third, fifth or sixth lens structure.

In the seventh lens structure, the auxiliary lens for increase in focal length is added to the varifocal lens system and transits the focal length of the varifocal lens system onto the side of a focal length longer than a longest focal length. The auxiliary lens for increase in focal length is constructed by an auxiliary lens having the above fourth, fifth or sixth lens structure.

In accordance with an eighth lens structure of the present invention, the lens system having the focal length transitional function in the seventh lens structure constitutes an objective lens system and an eyepiece system is arranged on an image side of the objective lens system, thereby constructing a finder.

In accordance with a ninth lens structure of the present invention, an auxiliary lens for transition of focal lengths is disposed in a varifocal lens system constructed by two or more lens groups and having a function for changing a focal length of the varifocal lens system by changing a distance between the lens groups while the position of an image face is constantly held. The auxiliary lens is additionally arranged in an increased clearance between lens groups in the state of a shortest focal length. The auxiliary lens transits the focal length of the lens system to the side of a focal length shorter than the shortest focal length of the lens system without changing the position of the image surface.

The auxiliary lens in the ninth lens structure is constructed by a lens group having negative refracting power such that a rear side principal point is located on an object side with respect to a front side principal point.

In accordance with a tenth lens structure of the present invention, an auxiliary lens for transition of focal lengths is disposed in a varifocal lens system constructed by two or more lens groups and having a function for changing a focal length of the varifocal lens system by changing a distance between the lens groups while the position of an image face is constantly held. The auxiliary lens is additionally arranged in an increased clearance between lens groups in the state of a longest focal length. The auxiliary lens transits (or changes) the focal length of the lens system increase than the longest focal length of the lens system without changing the position of the image face.

The auxiliary lens in the tenth lens structure is constructed by a lens group having negative refracting power such that a rear side principal point is located on an object side with respect to a front side principal point.

Similar to the fifth lens structure, in accordance with an eleventh lens structure of the present invention, the auxiliary lens having each of the ninth and tenth lens structures is preferably inserted in the vicinity of an entrance pupil about an optical system located on an image side with respect to an inserting position of the auxiliary lens.

In accordance with a twelfth lens structure of the present invention, the auxiliary lens having each of the ninth, tenth and eleventh lens structures can be constructed by a single lens although the auxiliary lens having each of the third to sixth lens structures is constructed by two lens groups having positive and negative refracting powers.

In the present invention, when focal lengths of the varifocal lens system are changed or transited, lenses of the varifocal lens system additionally having the auxiliary lens are arranged in a shortest or longest focal length state as they are. Accordingly, it is not necessary to readjust the lens arrangement by insertion of the auxiliary lens.

As mentioned above, the varifocal lens system additionally having the auxiliary lens in the present invention is constructed by two or more lens groups. Focal lengths of the varifocal lens system are changed by changing distances between the lens groups. When the distances between the lens groups are changed, there is a lens portion in which the distances between the lens groups are increased in a lens group arrangement in the shortest or longest focal length state. The auxiliary lens is inserted into this lens portion to transit the focal lengths of the varifocal lens system without changing the position of an image surface. The principle of transition of the focal lengths of the lens system in the present invention will next be explained when a focal length of the lens system is reduced as an example.

FIG. 1a typically shows a state in which the varifocal lens system is set to have a shortest focal length f. Reference numeral q designates an increased lens group distance provided by realizing the shortest focal length. An auxiliary lens for reducing the focal length of the varifocal lens system is inserted and arranged within this distance q.

A virtual combined lens 1 is shown as a single lens and is constructed by a group of lenses arranged on an object side with respect to an inserting position of the auxiliary lens. In the following description, this lens 1 is called a front side lens 1. A virtual combined lens 2 is shown as a single lens and is constructed by a group of lenses arranged on an image side with respect to the inserting position of the auxiliary lens. In the following description, this lens 2 is called a rear side lens 2. For brevity, the front side lens 1 is concretely set to have a positive focal length $f_1$ and the rear side lens 2 is concretely set to have a negative focal length $f_2$.

FIG. 1a shows a paraxial ray when the varifocal lens system has a shortest focal length f. This paraxial ray is incident to the front side lens 1 in parallel with an optical axis of the lens system from the object side (from the left-hand side in FIG. 1). The paraxial ray is then incident to an optical axis position on an image face I by refractive actions of the front side lens 1 and the rear side lens 2. Reference numeral $h_1$ designates a height of the paraxial ray when the paraxial ray is incident to the front side lens 1. Reference numeral $h_2$ designates a height of the paraxial ray when the paraxial Fay is incident to the rear side lens 2. Reference numeral $u_1$ designates an angle of refraction provided by the front side lens 1. Further, reference numeral LP1 designates an optical path of the paraxial ray between the front side lens 1 and the rear side lens 2.

Figure 1B:
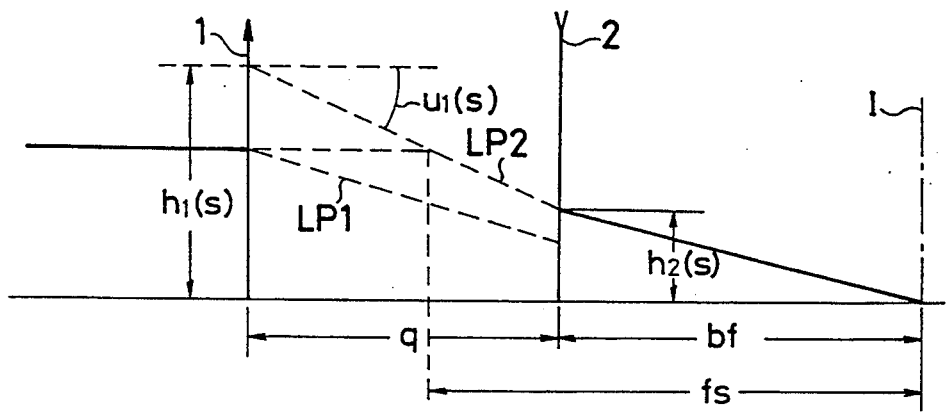

In the optical arrangement state shown in FIG. 1a, the focal length of the lens system is changed or transited to $f_S(<f)$ without changing a back focus bf. In this case, when a paraxial ray is reversely emitted from the optical axis position on the image face I to the object side, the height of this paraxial ray in the rear side lens 2 is equal to $h_2(S)$ as shown in FIG. 1b. The height of a ray refracted by the rear side lens 2 is equal to $h_1(S)$ when this refracted ray is extended to the front side lens 1 as it is. Reference numeral $u_1(S)$ designates a refractive angle of the refracted ray formed between the optical axis and an optical path LP2 which is located between the front side lens 1 and the rear side lens 2.

Figure 1C:
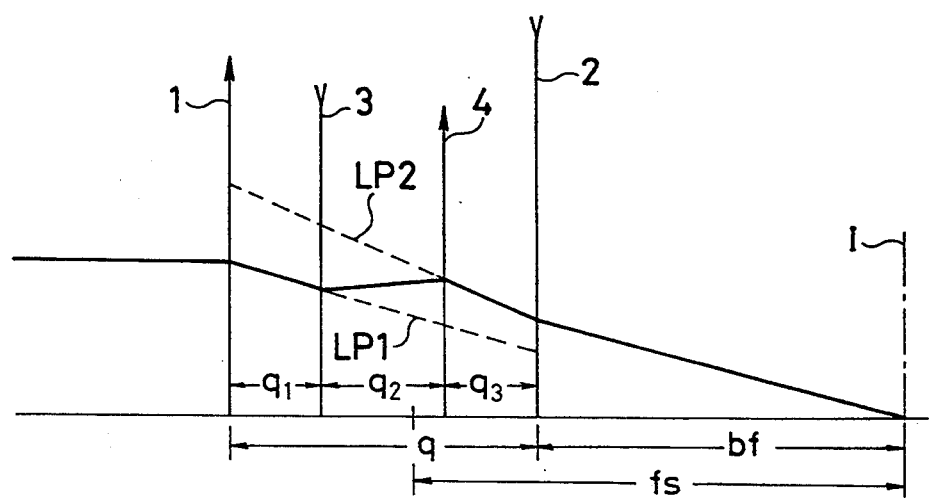

The focal length $f_S$ of the lens system is realized by an auxiliary lens while the position relation of the front side lens 1, the rear side lens 2 and the image surface I are held as shown in FIG. 1a. To realize such a focal length $f_S$, the optical path of a ray transmitted from the front side lens 1 to an image side through the optical path LP1 is connected to the optical path LP2 on the object side of the rear side lens 2 by a refractive action of the auxiliary lens. Therefore, as shown in FIG. 1c, a direction of the ray from the front side lens 1 is changed to a direction in which this ray is separated from the optical axis by a lens group 3 having negative refracting power. Next, this ray is refracted by a lens group 4 having positive refracting power such that the optical path of this ray is in conformity with the optical path LP2.

The above explanation is analyzed in detail in the following description. First, $u_1 = h_2\{(1/bf) - (1/f_2)\}$ and $u_1(S) = h_2(S)\{(1/bf) - (1/f_2)\}$ are formed so that $h_2(S)/h_2 = u_1(S)/u_1$ is formed. Further, $h_1 = h_2 + u_1q$, $u_1$: $h_1/f_1$, and $h_1(S) = h_2(S) + u_1(S)q$ are formed so that the following formula (1) is formed.

$$h_1(S) = \{h_2(S)/h_2\}h_1$$

In this case, since $h_2(S) > h_2$ is formed, $h_1(S) > h_1$ is formed.

A combined focal length $f_{C1}$ of the lens group 3 and a combined focal length $f_{C2}$ of the lens group 4 are represented as follows by using the above-mentioned values and distances $q_1$, $q_2$ and $q_3$ between the lens groups shown in FIG. 1c.

$$f_{C1} = \frac{[\{1 - (q_1/q)\}h_1 + (q_1h_2/q)]}{[(1/q_2)(h_2 - h_2(S))\{(q_3h_1/qh_2) + (1 - q_3/q)\}]} \quad (2)$$

$$f_{C2} = \frac{[\{(q_3h_1/qh_2) + (1 - q_3/q)\}h_2(S)]}{[(1/qq_2)(h_2(S) - h_2)\{(q - q_1) \times (h_1/h_2) + q_1\}]} \quad (3)$$

A positive or negative value of each of the focal lengths $f_{C1}$ and $f_{C2}$ is determined by the large or small relation in value between $h_2(S)$ and $h_2$ since $$\{1 - (q_1/q)\}h_1 + (q_1h_2/q) > 0,$$
$$\{(q_3h_1/qh_2) + (1 - q_3/q)\} > 0,$$
$$\{(q - q_1)(h_1/h_2) + q_1\} > 0,$$
$$q > 0, q_2 > 0.$$

Since $h_2(S) > h_2$ is formed, $f_{C1} < 0$ and $f_{C2} > 0$ are formed.

The above description is similarly considered when the focal length of the lens system is transited onto a longer focal length side. When a ray is reversely transmitted from the image face I to the object side, a height $h_2(L)$ of this ray in the rear side lens 2 is smaller than the ray height $h_2$. Therefore, in the above formulas (2) and (3), $h_2(S)$ is replaced with $h_2(L)$ and the relation $h_2(L) < h_2$ is used. In this case, in the auxiliary lens, the focal length $f_{C1} > 0$ of the lens group 3 on the object side is formed and the focal length $f_{C2} < 0$ of the lens group 4 on the image side is formed. Each of the above formulas (2) and (3) does not include $f_1$ and $f_2$. Accordingly, the above explanation is generally formed irrespective of a combination of positive and negative signs of refractive indices of the front side lens 1 and the rear side lens 2.

The auxiliary lens is constructed by the above two lens groups on the object and image sides. If the lens group on the object side has negative refracting power and the lens group on the image side has positive refracting power, a focal length of the varifocal lens system can be transited onto a shorter focal length side. In contrast to this, if the lens group on the object side has positive refracting power and the lens group on the image side has negative refracting power, the local length of the varifocal lens system can be transited onto a longer focal length side.

In the case of an auxiliary lens having the sixth lens structure of the present invention, an Abbe's number of the lens group having positive refracting power is set to be greater than that of the lens group having negative refracting power. Thus, chromatic aberration caused in the varifocal lens system can be corrected by insertion of the auxiliary lens.

The above description relates to the principle of a focal length transition using the auxiliary lens constructed by two lens groups respectively having positive and negative refracting powers. The following description relates to the principle of a focal length transition using an auxiliary lens constructed by one lens group in accordance With each of the ninth and tenth lens structures of the present invention.

Figure 8A:
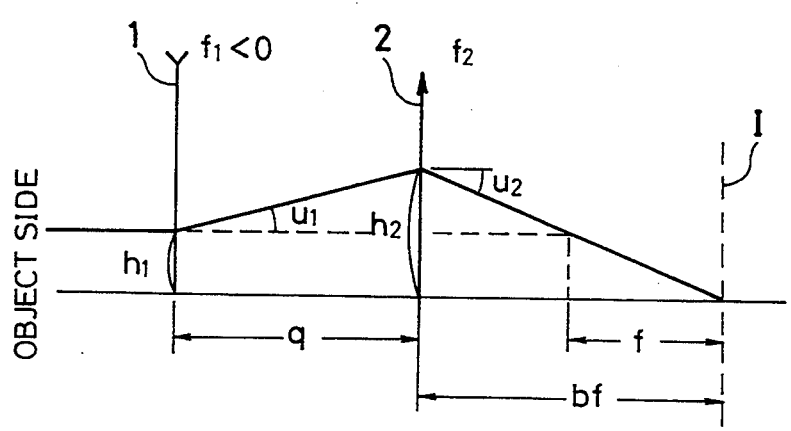
FIGS. 8a to 8d are views for explaining an increase in focal length of the lens system provided by an auxiliary lens in a ninth lens structure of the present invention.

FIGS. 8a to 8d are views for explaining a focal length transition using the auxiliary lens having the ninth lens structure of the present invention. In these figures, the same constructional portions as FIG. 1 are designated by the same reference numerals as FIG. 1. FIG. 8a shows a state in which the varifocal lens has a shortest focal length f. At this time, a front side lens 1 on an object side has a negative combined focal length and a rear side lens 2 on an image side has a positive combined focal length. An auxiliary lens is additionally arranged within a distance q between the front side lens 1 and the rear side lens 2.

Figure 8B:
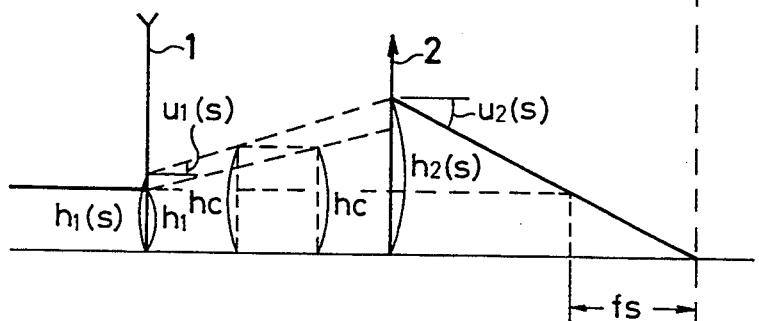

A shorter focal length $f_S$ is realized from the optical arrangement shown in FIG. 8a while the position of an image face I is constantly held. The height of a ray for realizing such a shorter focal length $f_S$ is set to $h_2(S)$ in the rear side lens 2. The height of a ray in the front side lens 1 directly connected to the height $h_2(S)$ of the above ray is set to $h_1(S)$ as shown in FIG. 8b and is higher than the height $h_1$ of an incident ray in the front side lens 1. Accordingly, if the auxiliary lens arranged within the lens group distance q to transit the focal length of the lens system to the shorter focal length $f_S$ is constructed by one lens group, an optical path of the ray incident to the front side lens 1 at height $h_1$ and having refractive angle $u_1$ with respect to the optical axis must be connected to an optical path of the ray having refractive angle $u_1(S)$ with respect to the optical axis and incident to the rear side lens 2 at height $h_2(S)$.

Figure 8C:
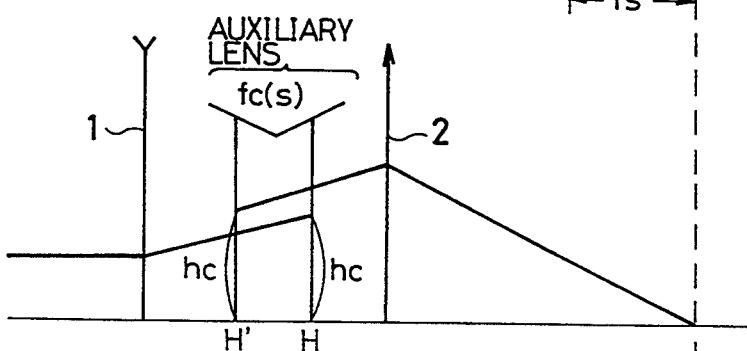

As shown in FIG. 8c, the above optical paths can be connected to each other by using an auxiliary lens in which a rear side principal point H' is located on the object side and a front side principal point H is located on the image side when the front side lens 1 located on the object side with respect to an additional position of the auxiliary lens has a negative combined focal length. When the above optical paths are connected to each other at a height $h_C$, the ray incident to the front side lens 1 at height $h_1$ is incident to the auxiliary lens at its front side principal point H at the ray height $h_C$. This ray is then emitted at height $h_C$ from the rear side principal point H' located on the object side with respect to the front side principal point tt, thereby emitting a higher ray. As mentioned above, $u_1 = h_2\{(1/bf) - (1/f_2)\}$ and $u_1(S) = h_2(S)\{(1/bf) - (1/f_2)\}$ are formed. In these formulas, $h_2(S) > h_2 > 0$ and $f_1 < 0$ are formed. Accordingly, $u_1 < 0$ and $u1(S) < 0$ are formed so that $u_1 > u_1(S)$ is formed. A focal length $f_C(S)$ of the auxiliary lens showing refracting power is provided as follows.

$f_C(S) = h_C/\{u_1(S) - u_1\} [h_C > 0]$

Accordingly, the refracting power of the auxiliary lens must be negative.

Figure 8D:
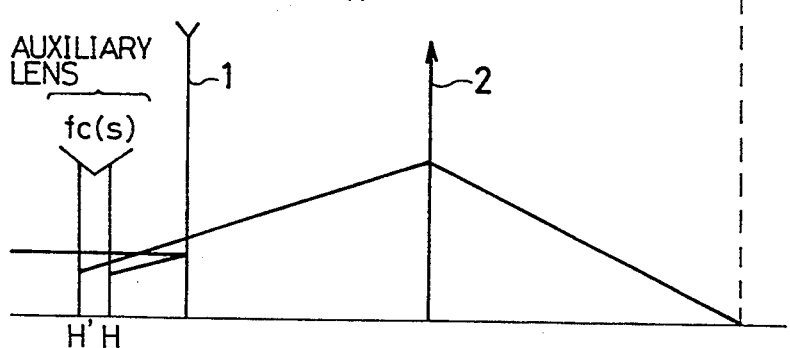

In FIG. 8c, the front and rear side principal points of the auxiliary lens are located within the lens group distance q. However, as shown in FIG. 8d, the front side principal point H of the auxiliary lens and the rear side principal point H' located on the object side with respect to the front side principal point H may be located on the object side of the front side lens 1. The auxiliary lens is additionally arranged within the lens group distance q even in such a case.

Figure 9A:
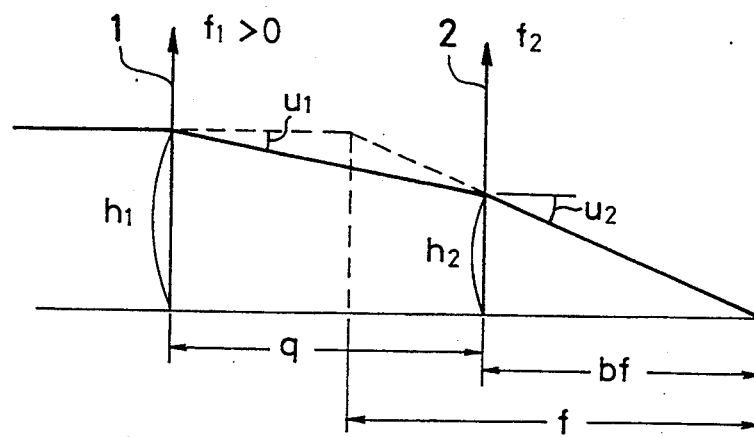
FIGS. 9a to 9c are views for explaining a decrease in focal length of the lens system provided by an auxiliary lens in a tenth lens structure of the present invention.
Figure 9B:
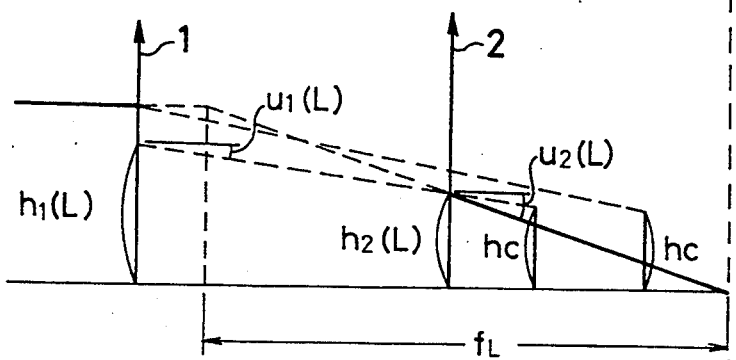
Figure 9C:
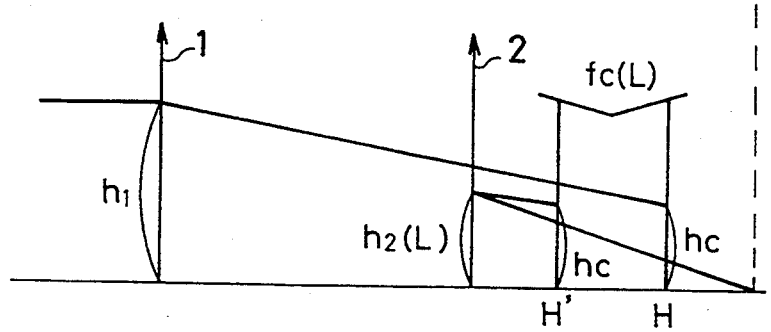

FIGS. 9a to 9c are views for explaining a focal length transition using an auxiliary lens having the tenth lens structure of the present invention. In these figures, the same constructional portions as FIG. 1 are designated by the same reference numerals as FIG. 1. A focal length f of the varifocal lens system in FIG. 9a is a longest focal length of the varifocal lens. A front side lens 1 on an object side has a positive combined focal length and a rear side lens 2 on an image side has a negative combined focal length. An auxiliary lens is additionally arranged within a distance q between the front side lens 1 and the rear side lens 2.

A longer focal length $f_L$ is realized from the optical arrangement shown in FIG. 9a while the position of an image face I is constantly held. As shown in FIG. 9b, the height of a ray for realizing such a longer focal length $f_L$ is set to $h_2(L)$ in the rear side lens 2. The height of a ray in the front side lens 1 directly connected to the height $h_2(L)$ of the above ray is set to $h_1(L)$ shown in FIG. 9b and is lower than the height $h_1$ of an incident ray in the front side lens 1. Accordingly, if the auxiliary lens arranged within the lens group distance q to transit the focal length of the lens system to the longer focal length $f_L$ is constructed by one lens group, an optical path of the ray incident to the front side lens 1 at height $h_1$ and having refractive angle $u_1$ with respect to an optical axis must be connected to an optical path of the ray having refractive angle $u_1(L)$ with respect to the optical axis and incident to the rear side lens 2 at height $h_2(L)$.

As shown in FIG. 9c, the above optical paths can be connected to each other by using an auxiliary lens in which a rear side principal point H' is located on the object side and a front side principal point H is located on the image side when the front side lens 1 located on the object side with respect to an additional position of the auxiliary lens has a positive combined focal length. When the above optical paths are connected to each other at a height $h_C$, the ray incident to the front side lens 1 at height $h_1$ is incident to the auxiliary lens at its front side principal point H at the ray height $h_C$. This ray is then emitted at height $h_C$ from the rear side principal point H' located on the object side with respect to the front side principal point H. The emitted ray is then incident to the rear side lens 2 at a height lower than the ray height $h_2$.

$u_1 = h_2\{(1/bf) - (1/f_2)\}$ and $u_1(L) = h_2(L)\{(1/bf) - (1/f_2)\}$ are formed. In these formulas, $h_2 > h_2(L) > 0$ and $f_1 > 0$ are formed. Accordingly, $u_1 > 0$ and $u_1(L) > 0$ are formed so that $u_1(L) < u_1$ is formed. A focal length $f_C(L)$ of the auxiliary lens showing refracting power is provided as follows.

$f_C(L) = h_C/\{u_1(L) - u_1\} [h_C > 0]$

Accordingly, the refracting power of the auxiliary lens must be negative.

In FIG. 9c, the front and rear side principal points of the auxiliary lens are located on the image side of the rear side lens 2. However, the auxiliary lens is additionally arranged within the lens group distance q.

In the fifth or eleventh lens structure of the present invention, an outside diameter of the auxiliary lens can be reduced by locating the additional position of the auxiliary lens in the vicinity of an entrance pupil of the rear side lens 2.

Concrete embodiments of the present invention will next be described.

Each of FIGS. 2 and 3 shows an embodiment in which the eighth lens structure of the present invention is applied to a zoom finder. The varifocal lens system constituting an objective lens system is constructed by four lens groups. A first lens group i is constructed by a first lens L1 and has positive refracting power. A second lens group ii is constructed by a second lens L2 and a third lens L3 and has negative refracting power. A third lens group iii is constructed by a fourth lens L4 and has positive refracting power. A fourth lens group iv is constructed by a fifth lens L5 and has positive refracting power. The above second lens group ii constitutes a variable section and the fourth lens group iv constitutes a compensator. An eyepiece system is arranged after this objective lens system.

As shown in FIG. 2a, reference numeral $R_i$ (i=1 to 16) designates a radius of curvature of an i-th lens face counted from the object side (i.e., the left-hand side) to an eye pupil side. $D_i$(i=1 to 15) designates a distance between the i-th lens face and an (i+1)-th lens face on the optical axis of the lens system. $N_j$ and $v_j$ respectively designate a refractive index and an Abbe's number of a j-th optical element counted from the object side. These values are provided in the following table in which $D_{16}$ designates a distance between a final lens face and an eye point.

| i | $R_i$ | $D_i$ | j | $N_j$ | $v_j$ |
|---|-------|-------|---|--------|--------|
| 1 | 20.063 | 2.690 | 1 | 1.49154 | 57.82 |
| 2 | −27.373 | variable | | | |
| 3 | 14.004 | 1.040 | 2 | 1.49154 | 57.82 |
| 4 | 4.418 | 2.820 | | | |
| 5 | −4.938 | 1.030 | 3 | 1.49154 | 57.82 |
| 6 | −9.726 | variable | | | |
| 7 | 10.101 | 2.130 | 4 | 1.49154 | 57.82 |
| 8 | −29.529 | variable | | | |
| 9 | 17.798 | 2.520 | 5 | 1.49154 | 57.82 |
| 10 | −13.587 | variable | | | |
| 11 | ∞ | 14.790 | 6 | 1.49154 | 57.82 |
| 12 | ∞ | 4.787 | | | |
| 13 | 14.981 | 27.500 | 7 | 1.49154 | 57.82 |
| 14 | ∞ | 0.300 | | | |
| 15 | 36.904 | 2.200 | 8 | 1.49454 | 57.82 |
| 16 | −19.251 | 15.000 | | | |

Each of first, fourth, fifth, tenth and thirteenth lens faces counted from the object side in this lens system is constructed by an aspherical surface. In the following description, R designates a radius of curvature of the aspherical surface on the optical axis and H designates a height of the aspherical surface from the optical axis. Further, X designates a coordinate of the aspherical surface conformed to the optical axis and K designates a conical constant. Further, A, B, C and D respectively designate aspherical coefficients of second, fourth, sixth and eighth orders. In this case, the aspherical surface is a curved surface represented by the following formula.

$$X = [(1/R)H^2/\{1+\sqrt{[Y]}\}] + A\cdot H^2 + B\cdot H^4 + C\cdot H^6 + D\cdot H^8,$$
$$Y = 1 - 1 - (1+K)(1/R)^2 H^2$$

In this formula, $\sqrt{[Y]}$ shows a square root of Y.

A shape of each of the above aspherical surfaces is specified by providing the conical constant K and the aspherical coefficients A, B, C and D of higher orders. E-number shows a power in the following representation of the aspherical coefficients of higher orders. For example, E−10 means $1/10^{10}$ and this value $1/10^{10}$ is multiplied by a number located before this value $1/10^{10}$.

Aspherical surfaces
first face
K=−2.049, A=0.0, B=−7.25E−5, C=−9.19E−7
D=7.03E−b 10
fourth face
K=−0.180, A=0.0, B=−7.21E−5, C=4.01E−6
D=1.91E−6
fifth face
K=−0.518, A=0.0, B=−6.29E−5, C=9.17E−5
D=8.11E−7
tenth face
K=2.328, A=0.0, B=6.13 E−4, C−7.96E−6
D=0.0
thirteenth face
K=−29.343, A=0.0, B=2.45E−4, 88E−6
D=0.0
Variable amounts
State of shortest focal length
$D_2=0.263$, $D_6=8.287$, $D_8=3.580$, D=0.670
The auxiliary lens for decreasing the focal length of the lens system is inserted and arranged within the distance $D_6$.
Variable amounts
State of longest focal length
$D_2=8.287$, $D_6=0.263$, $D_8=3.580$, $D_{10}=0.670$
The auxiliary lens for increasing the focal length of the lens system is inserted and arranged within the distance $D_2$.

FIG. 2a shows a state of the longest focal length of the varifocal lens system constituting an objective lens system. As shown in FIG. 2a, a distance $D_2$ between the first lens group i and the second lens group ii is increased. The auxiliary lens for increasing the focal length of the lens system is inserted into a space between the first lens group i and the second lens group if. As shown in FIG. 2b, this auxiliary lens is constructed by two lens groups composed of a lens $L_{c1}$ and a lens $L_{c2}$. The lens $L_{c1}$ has positive refracting power and is arranged on the object side. The lens $L_{c2}$ has negative refracting power and is arranged on an eye pupil side. As shown in FIG. 2b, $R_{ci}$ (i=1 to 4) designates a radius of curvature of a face of the auxiliary lens between the first lens group i and the second lens group ii. Further, $D_{ci}$ (i=0 to 4) designates a distance between faces of the auxiliary lens between the first lens group i and the second lens group ii. $N_{cj}$ and $v_{cj}$ (j=1 or 2) respectively designate a refractive index and an Abbe's number of a j-th lens counted from a first lens group side. The above-mentioned values are provided as follows.

| i | $R_{ci}$ | $D_{ci}$ | j | $N_{cj}$ | $v_{cj}$ |
|---|---|---|---|---|---|
| 0 | | 1.585 | | | |
| 1 | 9.500 | 1.518 | 1 | 1.49154 | 57.82 |
| 2 | 75.348 | 1.843 | | | |
| 3 | 18.000 | 1.355 | 2 | 1.58500 | 29.30 |
| 4 | 4.686 | 1.986 | | | |

FIG. 4a shows a ray state before the auxiliary lens for increasing the focal length of the lens system is inserted as shown in FIG. 2a. FIG. 4b shows a ray state after the auxiliary lens for increasing the focal length of the lens system is inserted as shown in FIG. 2b. In FIGS. 4a and 4b, reference numerals $F_1$, $F_2$, $F_3$ and $F_4$ respectively designate focal lengths of the first, second, third and fourth lens groups i to iv and are respectively set to 24.0, −8.0, 15.6 and 16.1. D1, D2 and D3 designate distances between the lens groups and are respectively set to 11.0, 3.1 and 5.6. BF designates a back focus and is set to 11.3. A longest focal length $F_{TELE}$ of the lens system before the insertion of the auxiliary lens is set to 20.9. A focal length $F_{c1}$ of the lens $L_{c1}$ as the first lens group of the auxiliary lens is set to 21.9. A focal length $F_{c2}$ of the lens $L_{c2}$ as the second lens group of the auxiliary lens is set to −11.2. In the ray state shown in FIG. 4b, lens group distances $d_1$, $d_2$ and $d_3$ are respectively set to 2.5, 4.2 and 3.3. Further, distances $HH_1'$ and $HH_2'$ between principal points are respectively set to 0.5 and 0.5. After the insertion of the auxiliary lens, a focal length $F_{S-TELE}$ of the lens system is changed or transited from 20.9 to 25.9. In this case, no position of an image surface in an objective lens system is changed before and after the insertion of the auxiliary lens.

FIG. 3a shows a shortest focal length state of the varifocal lens system constituting an objective lens system. As shown in FIG. 3a, a distance $D_6$ between the second lens group ii and the third lens group iii is increased. An auxiliary lens for decreasing the focal length of the lens system is inserted and arranged between the second and third lens groups. As shown in FIG. 3b, this auxiliary lens is constructed by two lens groups composed of a lens $L_{c1}'$ and a lens $L_{c2}'$. The lens $L_{c1}'$ has negative refracting power and is arranged on the object side. The lens $L_{c2}'$ has positive refracting power and is arranged on an eye pupil side. As shown in FIG. 3b, $R_{ci}'$ (i=1 to 4) designates a radius of curvature of a face of the auxiliary lens between the second lens group ii and the third lens group iii. Further, $D_{ci}'$ (i=0 to 4) designates a distance between faces of the auxiliary lens between the second lens group ii and the third lens group iii. $N_{cj}'$ and $v_{cj}'$ (j=1 or 2) respectively designate a refractive index and an Abbe's number of a j-th lens counted from a first lens group side. The above-mentioned values arc provided as follows.

| i | $R_{ci}'$ | $D_{ci}'$ | j | $N_{cj}'$ | $v_{cj}'$ |
|---|---|---|---|---|---|
| 0 | | 1.000 | | | |
| 1 | −5.324 | 2.050 | 1 | 1.58500 | 29.30 |
| 2 | 5.324 | 0.300 | | | |
| 3 | 6.407 | 1.920 | 2 | 1.49154 | 57.82 |
| 4 | −6.039 | 3.017 | | | |

FIG. 5a shows a ray state before the auxiliary lens for decreasing the focal length of the lens system is inserted as shown in FIG. 3a. FIG. 5b shows a ray state after the auxiliary lens for decreasing the focal length of the lens system is inserted as shown in FIG. 3b. D1, D2 and D3 designate distances between the lens groups and are respectively set to 3.0, 11.1 and 5.6. BF designates a back focus and is set to 11.3. A longest focal length $F_{WIDE}$ of the lens system before the insertion of the auxiliary lens is set to 8.0. A focal length $F_{c1}'$ of the lens $L_{c1}'$ as a first lens group of the auxiliary lens is set to −4.3. A focal length $F_{c2}'$ of the lens $L_{c2}'$ as a second lens group of the auxiliary lens is set to 6.7. In the ray state shown in FIG. 5b, lens group distances $d_1$, $d_2$ and $d_3$ are respectively set to 4.1, 1.6 and 4.0. Further, distances $HH_1'$ and $HH_2'$ between principal points are respectively set to 0.8 and 0.6. After the insertion of the auxiliary lens, a focal length $F_{S\text{-}WIDE}$ of the lens system is changed or transited from 8.0 to 7.0. In this case, no position of an image face in an objective lens system is changed before and after the insertion of the auxiliary lens.

In FIG. 3b, the position of an entrance pupil with respect to an optical system of lenses L4 to L8 is separated by 4.5 mm on the object side from a lens face of the third lens group iii on the object side. The auxiliary lens for decreasing the focal length of the lens system is located in this position. Thus, it is possible to reduce an outside diameter of the auxiliary lens.

FIGS. 6a to 6c arc diagrams respectively showing spherical aberration, astigmatism and distortional aberration in the above longest focal length state. FIGS. 6d to 6f are diagrams respectively showing spherical aberration, astigmatism and distortional aberration in a state in which the auxiliary lens for increasing the focal length of the lens system is inserted in this longest focal length state to transit the focal length onto a longer focal length side. Similarly, FIGS. 7a to 7c are diagrams respectively showing spherical aberration, astigmatism and distortional aberration in a shortest focal length state. FIGS. 7d to 7f are diagrams respectively showing spherical aberration, astigmatism and distortional aberration in a state in which the auxiliary lens for deercasing the focal length of the lens system is inserted in this shortest focal length state to transit the focal length onto a shorter focal length side (i.e., the shortest focal length is decreased). In those states, the above aberrations are preferably corrected. Since the Abbe's number of a positive lens in the auxiliary lens is set to be greater than that of a negative lens, chromatic aberration is preferably corrected after the insertion of the auxiliary lens when the focal length of the lens system is increased and decreased.

Figure 11A:
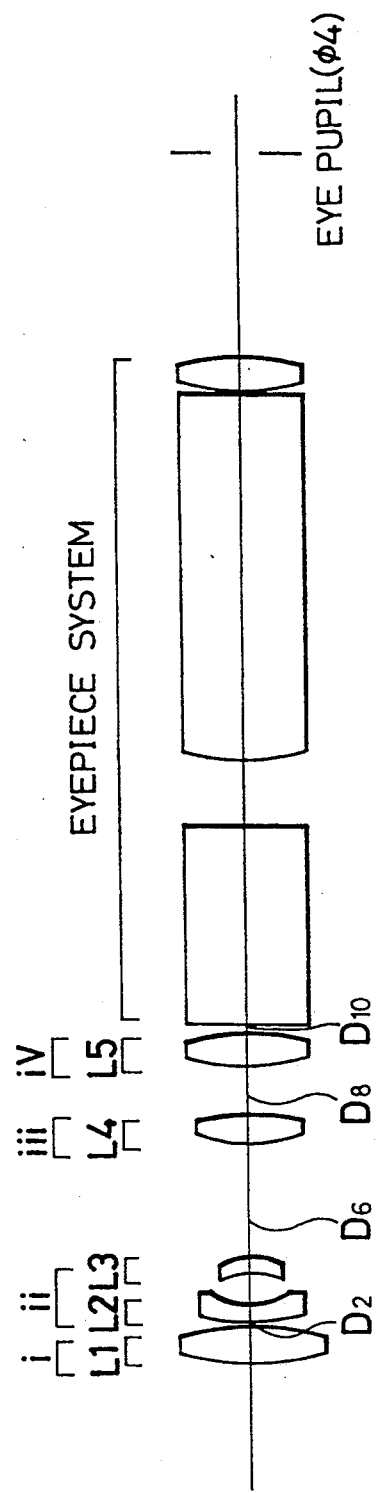
FIGS. 11a and 11b are views showing another embodiment in which the focal length of the lens system is decreased by insertion of the auxiliary lens in the tenth lens structure of the present invention.
Figure 11B:
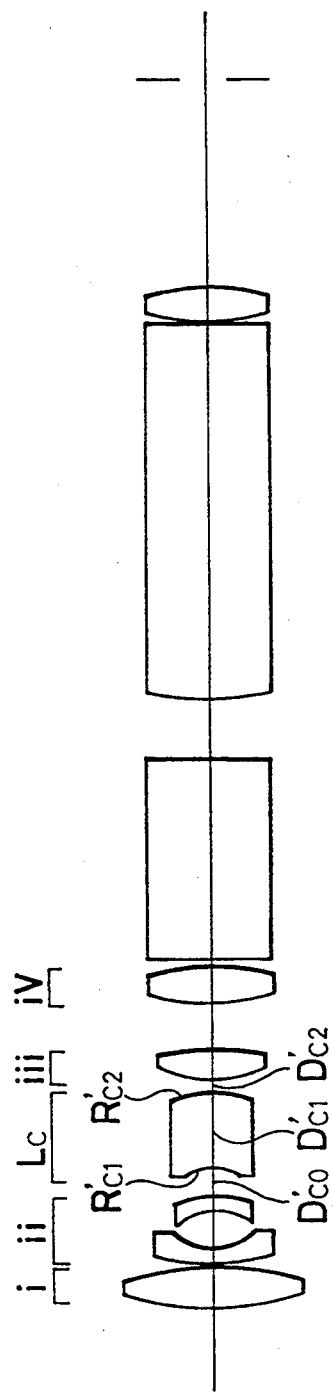

FIGS. 10a and 10b show an example in which focal lengths of a zoom finder are transited by an auxiliary lens having the ninth lens structure. FIGS. 11a and 11b show an example in which focal lengths of a zoom finder are transited by an auxiliary lens having the tenth lens structure. Each of these auxiliary lenses has eleventh and twelfth lens structures. For brevity, lenses and lens groups are designated by the same reference numerals as FIGS. 2 and 3 since there is no fear of confusion.

A varifocal lens system constituting an objective lens system is constructed by four lens groups. A first lens group i is constructed by a first lens L1 and has positive refracting power. A second lens group ii is constructed by a second lens L2 and a third lens L3 and has negative refracting power. A third lens group iii is constructed by a fourth hens L4 and has positive refracting power. A fourth lens group iv is constructed by a fifth lens L5 and has positive refracting power. The above second lens group ii constitutes a variable section and the fourth lens group iv constitutes a compensator. An eyepiece system is arranged after this objective lens system.

As shown in FIG. 10a, reference numeral $R_i$ (i=1 to 16) designates a radius of curvature of an i-th lens face counted from the object side to an eye pupil side. $D_i$ (i=1 to 16) designates a distance between the i-th lens face and an (i+1)-th lens face on an optical axis of the lens system. In this case, $D_{16}$ designates a distance between a final lens face and an eye point. $N_j$ and $v_j$ respectively designate a refractive index and an Abbe's number of a j-th optical element counted from the object side. These values are provided as follows.

| i | $R_i$ | $D_i$ | j | $N_j$ | $v_j$ |
|---|---|---|---|---|---|
| 1 | 20.063 | 2.690 | 1 | 1.49154 | 57.82 |
| 2 | −27.373 | variable | | | |
| 3 | 14.004 | 1.040 | 2 | 1.49154 | 57.82 |
| 4 | 4.418 | 2.820 | | | |
| 5 | −4.938 | 1.030 | 3 | 1.49154 | 57.82 |
| 6 | −9.726 | variable | | | |
| 7 | 10.101 | 2.130 | 4 | 1.49154 | 57.82 |
| 8 | −29.529 | variable | | | |
| 9 | 17.798 | 2.520 | 5 | 1.49154 | 57.82 |
| 10 | −13.587 | variable | | | |
| 11 | ∞ | 14.790 | 6 | 1.49154 | 57.82 |
| 12 | ∞ | 4.220 | | | |
| 13 | 15.957 | 27.500 | 7 | 1.49154 | 57.82 |
| 14 | ∞ | 0.300 | | | |
| 15 | 36.904 | 2.200 | 8 | 1.49454 | 57.82 |
| 16 | −18.301 | 15.000 | | | |

Each of first, fourth, fifth, tenth and thirteenth lens faces counted from the object side in this lens system is constructed by an aspherical surface.

Aspherical surfaces
first face
$K = -2.049$, $A = 0.0$, $B = -7.25E-5$, $C = -9.19E-7$
$D = 7.03E-10$
fourth face
$K = -0.180$, $A = 0.0$, $B = -7.21E-5$, $C = 4.01E-6$
$D = 1.91E-6$
fifth face
$K = -0.518$, $A = 0.0$, $B = -6.29E-5$, $C = 9.17E-5$
$D = 8.11E-7$
tenth face
$K = 2,328$, $A = 0.0$, $B = 6.13E-4$, $C = 7.96E-6$
$D = 0.0$
thirteenth face
$K = -29.343$, $A = 0.0$, $B = 2.45E-4$, $C = -3.88E-6$
$D = 0.0$
Variable amounts
State of shortest focal length
(magnification: 0.368)
$D_2 = 0.263$, $D_6 = 8.287$, $D_8 = 3.580$, $D_{10} = 0.670$
The auxiliary lens for decreasing the focal length of the lens system is inserted and arranged within the distance $D_6$.
Variable amounts
State of longest focal length
(magnification: 0.963)
$D_2 = 8.287$, $D_6 = 0.263$, $D_8 = 3.580$, $D_{10} = 0.670$
The auxiliary lens for increasing the focal length of the lens system is inserted and arranged within the distance $D_2$.

FIG. 10a shows a longest focal length state of the varifocal lens system constituting an objective lens system. As shown in FIG. 10a, a distance $D_2$ between the first lens group i and the second lens group ii is increased. An auxiliary lens $I_c$ for increasing the focal length of the lens system is inserted into a space between the first lens group i and the second lens group if. As shown in FIG. 10b, this auxiliary lens $L_c$ is constructed by a single lens. $R_{ci}$ (i=1, 2) designates a radius of curvature of a face of the auxiliary lens between the first lens group i and the second lens group ii. Further, $D_{ci}$ (i=0 to 2) designates a distance between faces of the auxiliary lens between the first lens group i and the second lens group ii. $N_c$ and $v_c$ respectively designate a refractive index and an Abbe's number of the auxiliary lens. The abovementioned values are provided as follows.

| i | $R_{ci}$ | $D_{ci}$ | $N_c$ | $v_c$ |
|---|---|---|---|---|
| 0 |  | 1.439 |  |  |
| 1 | 8.4438 | 5.419 | 1.58500 | 29.30 |
| 2 | 4.518 | 1.429 |  |  |

Figure 12A:
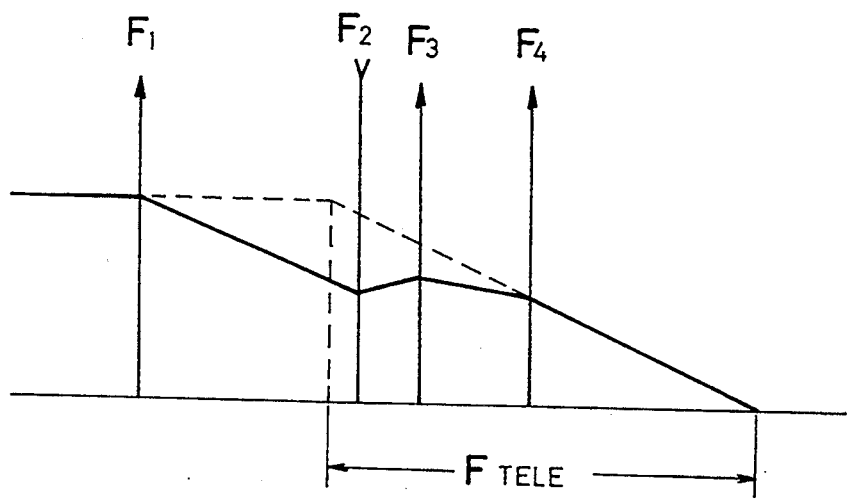
FIGS. 12a and 12b are diagrams showing light transmitted through the ninth lens structure in the embodiment of the present invention shown in FIG. 10.
Figure 12B:
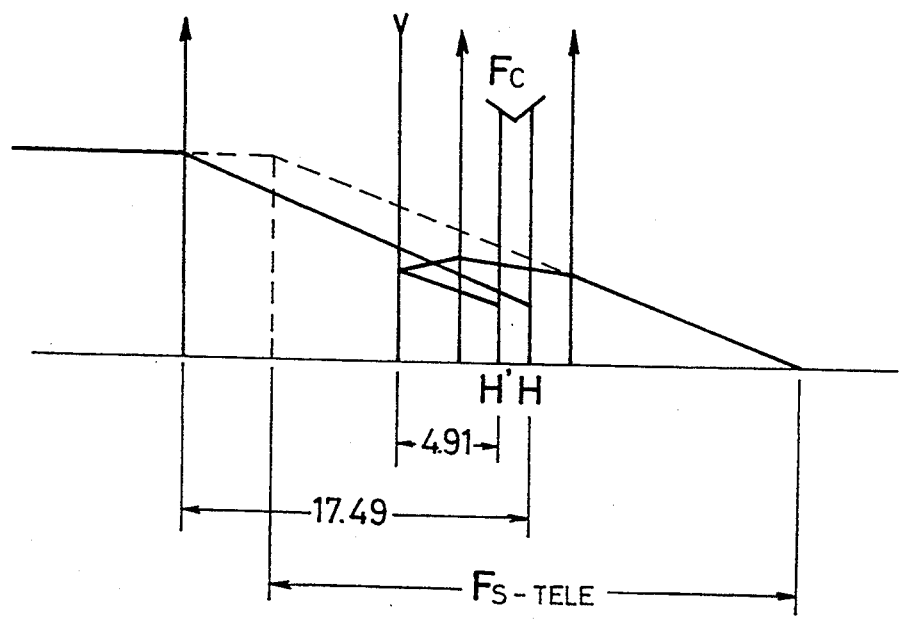

FIG. 12a shows a ray state before the auxiliary lens $L_c$ for increasing the focal length of the lens system is inserted as shown in FIG. 10a. FIG. 12b shows a ray state after the auxiliary lens $L_c$ for increasing the focal length of the lens system is inserted as shown in FIG. 10b. In FIGS. 12a and 12b, reference numerals $F_1$, $F_2$, $F_3$ and $F_4$ respectively designate focal lengths of the first, second, third and fourth lens groups i to iv and are respectively set to 24.0, −8.02, 15.59 and 16.1.

D1, D2 and D3 designate distances between the lens groups and are respectively set to 11.03, 3.16 and 5.65. BF designates a back focus and is set to 11.34. A longest focal length $F_{TELE}$ of the lens system before the insertion of the auxiliary lens is set to 20.93. A focal length $F_c$ of the auxiliary lens $L_c$ is set to −33.86. A distance HH' between principal points is set to −1.55. After the insertion of the auxiliary lens, a focal length $F_{S\text{-}TELE}$ of the lens system is changed or transited from 20.93 to 25.91. In this case, no position of an image face in an objective lens system is changed before and after the insertion of the auxiliary lens.

FIG. 11a shows a shortest focal length state of the varifocal lens system constituting an objective lens system. As shown in FIG. 11a, a distance $D_6$ between the second lens group ii and the third lens group iii is increased. An auxiliary lens $L_c'$ for decreasing the focal length of the lens system is inserted and arranged between the second and third lens groups. As shown in FIG. 11b, this auxiliary lens $L_c'$ is constructed by a single lens. $R_{ci}'$ (i=1, 2) designates a radius of curvature of a face of the auxiliary lens between the second lens group ii and the third lens group iii. Further, $D_{ci}'$ (i=0 to 2) designates a distance between faces of the auxiliary lens between the second lens group ii and the third lens group iii. $N_c'$ and $v_c'$ respectively designate a refractive index and an Abbe's number of the auxiliary lens. The above-mentioned values are provided as follows.

| i | $R_{ci}'$ | $D_{ci}'$ | $N_c'$ | $v_c'$ |
|---|---|---|---|---|
| 0 |  | 1.977 |  |  |
| 1 | −4.525 | 5.419 | 1.58500 | 29.30 |
| 2 | −8.332 | 0.891 |  |  |

Figure 13A:
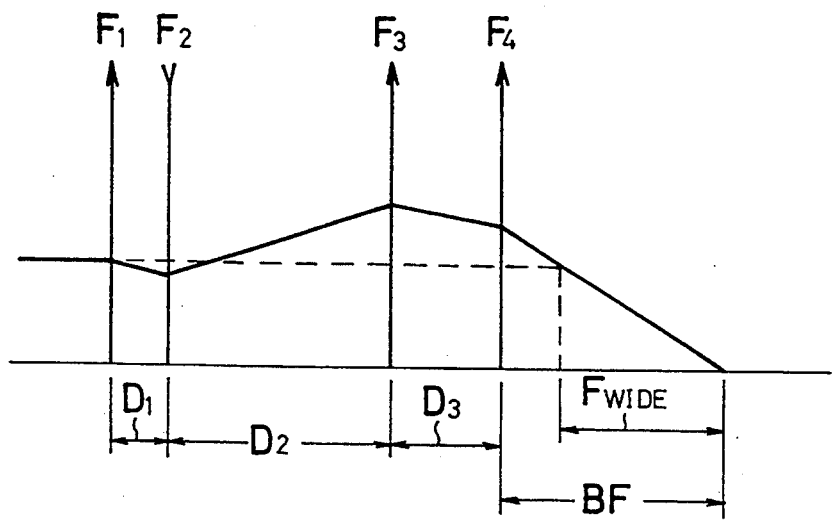
FIGS. 13a and 13b are diagrams showing light transmitted through the tenth lens structure in the embodiment of the present invention shown in FIG. 11.
Figure 13B:
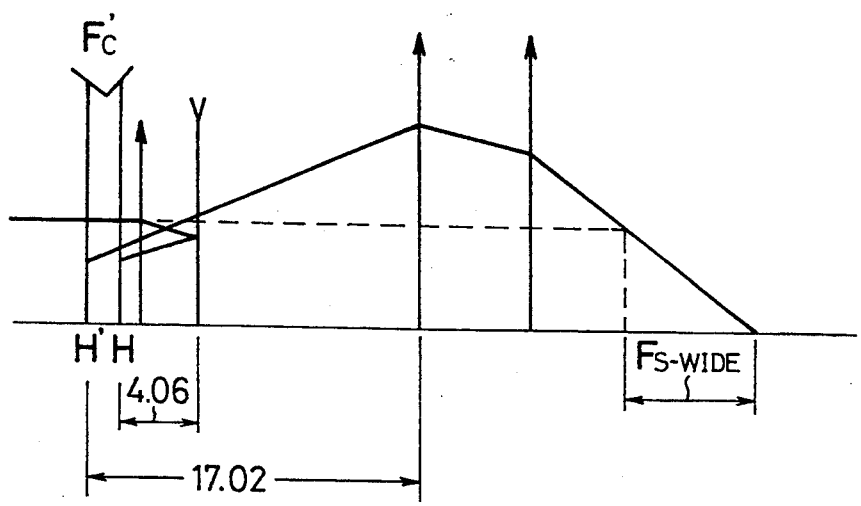

FIG. 13a shows a ray state before the auxiliary lens $L_c'$ for decreasing the focal length of the lens system is inserted as shown in FIG. 11a. FIG. 13b shows a ray state after the auxiliary lens $L_c'$ for decreasing the focal length of the lens system is inserted as shown in FIG. 11b. In FIGS. 13a and 13b, reference numerals $F_1$, $F_2$, $F_3$ and $F_4$ respectively designate focal lengths of the first, second, third and fourth lens groups i to iv and are respectively set to 24.0, −8.02, 15.59 and 16.1.

D1, D2 and D3 designate distances between the lens groups and are respectively set to 3.01, 11.18 and 5.65. BF designates a back focus and is set to 11.34. A shortest focal length $F_{WIDE}$ of the lens system before the insertion of the auxiliary lens is set to 7.99. A focal length $F_c'$ of the auxiliary lens $L_c'$ is set to −35.66. A distance HH' between principal points is set to −1.78. After the insertion of the auxiliary lens, a focal length $F_{S\text{-}WIDE}$ of the lens system is changed or transited from 7.987 to 5.39. In this case, no position of an image face in an objective lens system is changed before and after the insertion of the auxiliary lens.

In FIG. 10b, the position of an entrance pupil in an optical system of lenses L2 to L8 with respect to an exit pupil is separated by 1.5 mm on the object side from an image side lens face of the lens $L_2$ of the second lens group ii. The auxiliary lens $L_c$ for increasing the focal length of the lens system is located in this position. Thus, it is possible to reduce an outside diameter of the auxiliary lens $L_C$.

Similarly, in FIG. 11b, the position of an entrance pupil in an optical system of lenses L4 to L8 with respect to an exit pupil is separated by 4.5 mm on the object side from an object side lens face of the third lens group iii. The auxiliary lens $L_c'$ for decreasing the focal length of the lens system is located in this position. Thus, it is possible to reduce an outside diameter of the auxiliary lens $L_c'$.

FIGS. 14a to 14c are diagrams respectively showing spherical aberration, astigmatism and distortional aberration in the longest focal length state shown in FIG. 10a. FIGS. 14d to 14f are diagrams respectively showing spherical aberration, astigmatism and distortional aberration in a state in which the auxiliary lens $L_c$ for increasing the focal length of the lens system is inserted in this longest focal length state to transit the focal length onto a longer focal length side. Similarly, FIGS. 15a to 15c arc diagrams respectively showing spherical aberration, astigmatism and distortional aberration in a shortest focal length state shown in FIG. 11a. FIGS. 15d to 15f are diagrams respectively showing spherical aberration, astigmatism and distortional aberration in a state in which the auxiliary lens $L_c'$ for decreasing the focal length of the lens system is inserted in this shortest focal length state to transit the focal length onto a shorter focal length side. In these states, the above aberrations are preferably corrected.

In the embodiments shown in FIGS. 10 and 11, transitional magnification modes of 0.294 and 1.192 can be realized in a finder having a continuous zooming region from 0.368 to 0.963. Thus, a high zoom ratio of 4 times is realized in the transitional magnification modes.

Shapes of the respective lenses shown in FIGS. 2 and 3 seem different from those shown in FIGS. 10 and 11 since only lens portions relative to the formation of an image are drawn.

As mentioned above, the present invention provides a novel focal length transitional method, a novel auxiliary lens for transiting focal lengths, and a novel lens system and a novel finder having a focal length transitional function. In the above-mentioned constructions of the present invention, the focal length of a varifocal lens system having a varifocal function can be changed or transited to a focal length shorter than a shortest focal length and to a focal length longer than a longest focal length. In this case, the position of an image surface can be constantly held so that it is not necessary to adjust a lens position before and after insertion of the auxiliary lens. Accordingly, no entire length of the lens system is changed by the insertion of the auxiliary lens.

The auxiliary lens is inserted and arranged within a lens group distance increased in a longest or shortest focal length state. Accordingly, it is not necessary to secure a space for inserting the auxiliary lens in advance in the varifocal lens system. Accordingly, the varifocal lens can be made compact in design.

In particular, an auxiliary lens having the twelfth lens structure is constructed by a single lens so that the auxiliary lens has a simplified structure and can be cheaply manufactured.

In accordance with the fifth and eleventh lens structures of the present invention, the diameter of an auxiliary lens can be reduced so that a space for escaping the auxiliary lens can be reduced. In accordance with the sixth lens structure of the present invention, chromatic aberration of a varifocal lens can be preferably corrected by insertion of the auxiliary lens.

As shown in the above embodiments, it is possible to construct a focal length transitional method and a lens system and a finder having a focal length transitional function by using the auxiliary lens having each of the ninth to twelfth lens structures.

Many widely different embodiments of the present invention may be constructed without departing from the spirit and scope of the present invention. It should be understood that the present invention is not limited to the specific embodiments described in the specification, except as defined in the appended claims.

What is claimed is:

1. A focal length transitional method used in a varifocal lens system which is constructed by two or more lens groups and has a function for changing a focal length of the lens system by changing a distance between the lens groups while the position of an image surface is held constant;

said focal length transitional method comprising the step of inserting an auxiliary lens constructed by two lens groups having positive and negative refracting powers into an increased clearance between lens groups in a longest focal length state such that a lens group having the positive refracting power is located on an object side and thereby changing the focal length of the lens system such that a longest focal length of the lens system is increased without changing said position of the image surface by the insertion of the auxiliary lens.

2. An auxiliary lens for transition of focal lengths added to a varifocal lens system which is constructed by two or more lens groups and has a function for changing a focal length of the lens system by changing a distance between the lens groups while the position of an image surface is held constant;

the auxiliary lens changing the focal length of the lens system such that a longest focal length of said lens system is increased without changing said position of the image surface;

the auxiliary lens being constructed by two lens groups including one lens group having a positive refracting power on an object side and another lens group having a negative refracting power on an image side; and the auxiliary lens being inserted into an increased clearance between lens groups in a state of the longest focal length of said varifocal lens system.

3. An auxiliary lens for transition of focal lengths as claimed in claim 2, wherein the auxiliary lens for transition of focal lengths is inserted in the vicinity of an entrance pupil about an optical system located on the image side with respect to an inserting position of the auxiliary lens.

4. An auxiliary lens for transition of focal lengths as claimed in claim 2 or 3, wherein $v_P > v_N$ is formed when $v_P$ is an Abbe's number of a lens having the positive refracting power and $v_N$ is an Abbe's number of a lens having the negative refracting power.

5. A lens system having a focal length transitional function comprising:

a varifocal lens system constructed by three or more lens groups and having a function for changing a focal length of the varifocal lens system by changing a distance between the lens groups while the position of an image surface is held constant; and an auxiliary lens for an increase in focal length;

the auxiliary lens for increase in focal length being added to said varifocal lens system for changing the focal length of the varifocal lens system such that a longest focal length is increased;

the auxiliary lens for increase in focal length being constructed by two lens groups including one lens group having a positive refracting power on the object side and another lens group having a negative refracting power on the image side; and the auxiliary lens for increase in focal length being inserted into an increased clearance between lens groups in a state of the longest focal length of said varifocal lens system.

6. An auxiliary lens for transition of focal lengths as claimed in claim 5, wherein the auxiliary lens for transition of focal lengths is inserted in the vicinity of an entrance pupil about an optical system located on the image side with respect to an inserting position of the auxiliary lens.

7. An auxiliary lens for transition of focal lengths as claimed in claim 5 or 6, wherein $v_P > v_N$ is formed when $v_P$ is an Abbe's number of a lens having the positive refracting power and $v_N$ is an Abbe's number of a lens having the negative refracting power.

8. A finder comprising:

an objective lens system constructed by a lens system having a focal length transitional function; and an eyepiece system arranged on an image side of the objective lens system;

said lens system having the focal length transitional function comprising:

a varifocal lens system constructed by three or more lens groups and having a function for changing a focal length of the varifocal lens system by changing a distance between the lens groups while the position of an image surface is held constant; and at least one of an auxiliary lens for decrease in focal length and an auxiliary lens for increase in focal length;

the auxiliary lens for decrease in focal length being added to said varifocal lens system for changing the focal length of the varifocal lens system such that a shortest focal length is decreased;

the auxiliary lens for increase in focal length being added to said varifocal lens system for changing the focal length of the varifocal lens system such that a longest focal length is increased;

the auxiliary lens for decrease in focal length being constructed by two lens groups including one lens group having a negative refracting power on an object side and another lens group having a positive refracting power on an image side;

the auxiliary lens for decrease in focal length being inserted into an increased clearance between lens groups in a state of the shortest focal length of said varifocal lens system;

the auxiliary lens for increase in focal length being constructed by two lens groups including one lens group having a positive refracting power on the object side and another lens group having a negative refracting power on the image side; and the auxiliary lens for increase in focal length being inserted into an increased clearance between lens groups in a state of the longest focal length of said varifocal lens system.

9. A finder as claimed in claim 8, wherein the auxiliary lens for transition of focal lengths is inserted in the vicinity of an entrance pupil about an optical system located on the image side with respect to an inserting position of the auxiliary lens.

10. A finder as claimed in claim 8 or 9, wherein $v_P > v_N$ is formed when $v_P$ is an Abbe's number of a lens having the positive refracting power and $v_N$ is an Abbe's number of a lens having the negative refracting power.

11. An auxiliary lens for transition of focal lengths in a varifocal lens system constructed by two or more lens groups and having a function for changing a focal length of the varifocal lens system by changing a distance between the lens groups while the position of an image surface is held constant;

the auxiliary lens being additionally arranged in an increased clearance between lens groups in the state of a shortest focal length;

the auxiliary lens changing the focal length of the lens system such that said shortest focal length of the lens system is decreased without changing said position of the image surface; and the auxiliary lens constructed by a single lens having negative refracting power such that a rear side principal point is located on an object side with respect to a front side principal point.

12. An auxiliary lens for transition of focal lengths as claimed in claim 11, wherein the auxiliary lens for transition of focal lengths is inserted in the vicinity of an entrance pupil about an optical system located on an image side with respect to an inserting position of the auxiliary lens.

13. An auxiliary lens for transition of focal lengths in a varifocal lens system constructed by two or more lens groups and having a function for changing a focal length of the varifocal lens system by changing a distance between the lens groups while the position of an image surface is held constant;

the auxiliary lens being additionally arranged in an increased clearance between lens groups in the state of a longest focal length;

the auxiliary lens changing the focal length of the lens system such that said longest focal length of the lens system is increased without changing said position of the image surface; and the auxiliary lens constructed by a single lens having a negative refracting power such that a rear side principal point is located on an object side with respect to a front side principal point.

14. An auxiliary lens for transition of focal lengths as claimed in claim 13, wherein the auxiliary lens for transition of focal lengths is inserted in the vicinity of an entrance pupil about an optical system located on an image side with respect to an inserting position of the auxiliary lens.

* * * * *